United States Patent [19]

Sakamoto et al.

[11] Patent Number: 5,317,623
[45] Date of Patent: May 31, 1994

[54] METHOD OF HANDOVER AND ROUTE DIVERSITY IN MOBILE RADIO COMMUNICATION

[75] Inventors: Masayuki Sakamoto; Masaharu Hata, both of Yokosuka, Japan

[73] Assignee: Nippon Telegraph and Telephone Corporation, Tokyo, Japan

[21] Appl. No.: 770,104

[22] Filed: Oct. 2, 1991

[30] Foreign Application Priority Data

| Oct. 2, 1990 | [JP] | Japan | 2-263136 |
| Oct. 2, 1990 | [JP] | Japan | 2-263137 |
| Oct. 2, 1990 | [JP] | Japan | 2-263138 |
| Oct. 4, 1990 | [JP] | Japan | 2-265145 |

[51] Int. Cl.⁵ .......................................... H04M 11/00
[52] U.S. Cl. .................................. 379/60; 379/59; 455/33.2; 455/33.4
[58] Field of Search .......... 379/59, 60; 455/33.1, 455/33.2, 33.4, 56.1, 33.3

[56] References Cited

U.S. PATENT DOCUMENTS

| 4,112,257 | 9/1978 | Frost | 379/59 |
| 4,686,671 | 8/1987 | Brian et al. | 455/56.1 |
| 4,881,271 | 11/1989 | Yamouchi et al. | 379/59 |

FOREIGN PATENT DOCUMENTS

| 3210298 | 9/1983 | Fed. Rep. of Germany . |
| 63-48925 | 3/1988 | Japan . |
| 2138652 | 10/1984 | United Kingdom . |

OTHER PUBLICATIONS

IEEE Communications Magazine, vol. 27, No. 7, Jul. 1989, pp. 20-29, R. Steele, "The Cellular Environment of Lightweight Handheld Portables".
Review of the Electrical Communication Laboratories, vol. 25, Nos. 11-12, Nov.-Dec. 1977, pp. 1147-1156, S. Ito, et al., "800 MHz Band Land Mobile Telephone System-Overall View".
IEEE Communication Magazine, Mar. 1979, pp. 9-16, N. Ehrlich, "The Advanced Mobile Phone Service".
Microwave Mobile Communications, pp. 377-387, "Mobile Radio Systems".

Primary Examiner—Curtis Kurtz
Assistant Examiner—Dwayne D. Bost
Attorney, Agent, or Firm—Oblon, Spivak, McClelland, Maier & Neustadt

[57] ABSTRACT

A method of handover and route diversity in a mobile radio communication which is less time consuming and capable of improving the frequency spectrum utilization efficiency and securing the high quality of service regardless of the moving speed of the mobile station. In the method, a loop transmission line by which each base station is connected with neighboring base stations is provided; a handover information is transmitted through the loop transmission line, where the handover information is relayed by each base station from one of the neighboring base stations to another one of the neighboring base station; and the handover of a communication of a mobile station from one traffic channel of one base station to an idle traffic channel of another base station is carried out by using the handover information transmitted through the loop transmission line. The method can also be applied to a route diversity reception.

25 Claims, 19 Drawing Sheets

FIG.8

| SIGNAL IDENTIFICATION | BASE STATION IDENTIFICATION | TRAFFIC CHANNEL NUMBER | RECEIVING LEVEL INFORMATION | SIGNAL IDENTIFICATION | BASE STATION IDENTIFICATION | IDLE TRAFFIC CHANNEL NUMBER | ORIGINAL BASE STATION IDENTIFICATION | ORIGINAL TRAFFIC CHANNEL NUMBER |
|---|---|---|---|---|---|---|---|---|
| 120 | 121 | 122 | 123 | 130 | 131 | 132 | 133 | 134 |

FIG.9

| SIGNAL IDENTIFICATION | BASE STATION IDENTIFICATION | MEASURING BASE STATION IDENTIFICATION | TRAFFIC CHANNEL NUMBER | MEASURED RECEIVING LEVEL INFORMATION | IDLE TRAFFIC CHANNEL NUMBER |
|---|---|---|---|---|---|
| 120 | 121 | 135 | 122 | 136 | 132 |

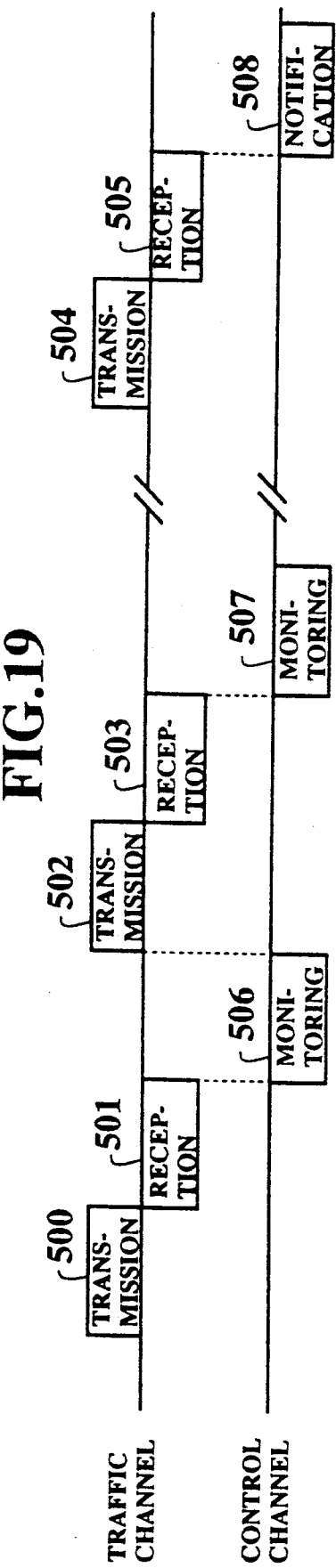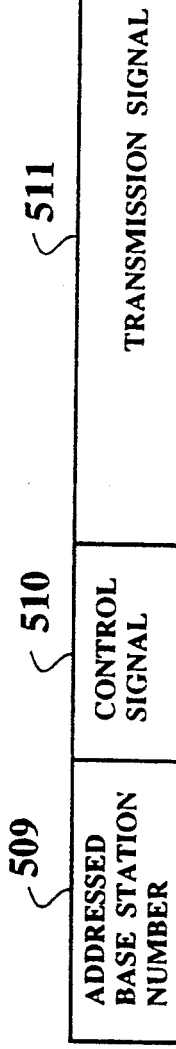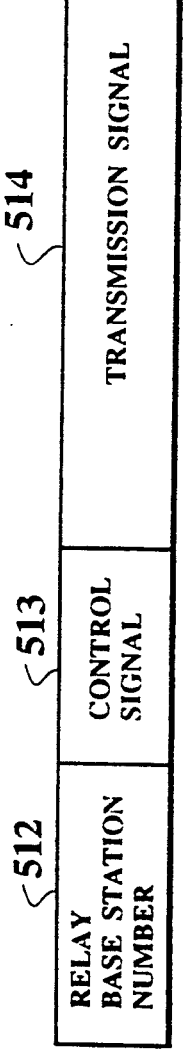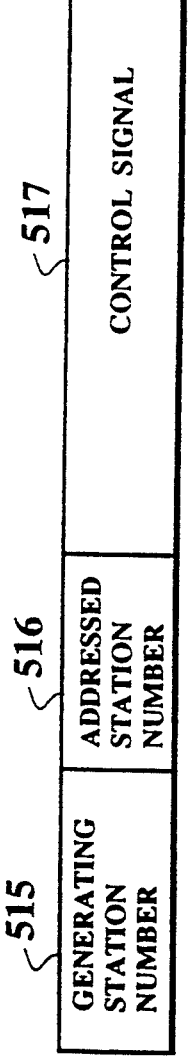
FIG.19
FIG.20
FIG.21
FIG.22

METHOD OF HANDOVER AND ROUTE DIVERSITY IN MOBILE RADIO COMMUNICATION

BACKGROUND OF THE INVENTION

1. Field of the Invention

The present invention relates to a method of handover and route diversity operations in a mobile radio communication system such as an automobile telephone system.

2. Description of the Background Art

In a mobile radio communication system, the efficient utilization of limited frequency spectrum is one of the major technical problems. For this reason, a so called cellular system is adopted in general. In this cellular system, the efficient frequency spectrum utilization is achieved by providing a plurality of mutually distanced base stations within a service area of the system so as to enable a so called co-channel reuse which is a repetitive use of the same frequency at different base stations, where the base stations are sufficiently distanced from each other to avoid a co-channel interference. In such a cellular system, an area covered by each base station is called a cell.

In this cellular system, a higher frequency spectrum utilization efficiency can be achieved by making a radius of each cell smaller, because it becomes possible for the same frequency to be repetitively used at shorter distances. Such a use of smaller size cells is effective in increasing a system capacity regarding a number of subscribers that can be handled by the system.

However, as a consequence of an increased number of cells required for covering the entire service area, such a use of smaller size cells also necessitates an increased number of so called handover operations required to be performed when a mobile station moves from one cell to another during a single continuous communication. As a result, the capacities and sizes of each base station and a central control station controlling the base stations will be increased considerably and configurations of the base stations and the central control station will inevitably become quite complicated.

Namely, in the cellular system, as a mobile station which is communicating through one particular base station of one particular cell moves from that particular cell to a neighboring cell, the receiving level at that particular base station will gradually decreases, so that in order to continue this communication it is necessary to switch the base station through which the mobile station communicates from that particular base station of that particular cell to the base station of the neighboring cell. Here, in switching the base station, an active land transmission line connecting the central control station with the base station needs to be switched, while the frequency used for the communication by that mobile station needs to be switched from the traffic channel used in an original cell from which the mobile station is moving out to that of an idle traffic channel available in the base station of a destination cell to which the mobile station is moving in. Such an operation is known as the handover operation (which is sometimes also referred to as a handoff operation).

More specifically, as shown in FIG. 1, a conventional cellular system comprises a central control station 1, and a plurality (four in FIG. 1) of base stations 2 to 5 controlled by the central control station 1 through land transmission lines 11 to 14, respectively, where a mobile station 10 moves through a plurality (four in FIG. 1) of cells 6 to 9 associated with the base stations 2 to 5, respectively. In this cellular system, the central control station 1 is connected to an ordinary telephone network (not shown), such that a communication to and from the mobile station 10 can be transmitted through one of the base stations 2 to 5, the central control station 1, and the ordinary telephone network.

Now, assuming that the mobile station 10 is located in a cell 8 and communicating through the base station 4, as the mobile station 10 moves to the neighboring cell 7, the handover operation will proceed as follows.

(1) As a distance between the base station 4 and the mobile station 10 becomes greater than the cell radius, the receiving level at the base station 4 decreases below the specific level. When this decrease of the receiving level is detected by the base station 4, the base station 4 requests the handover of the communication of the mobile station 10 to the central control station I through the land transmission line 13.

(2) In response to this request for the handover from the base station 4, the central control station 1 commands the neighboring base stations 2, 3, and 5 to monitor the transmitted radio waves from the mobile station 10 through the land transmission lines 11, 12, and 14, respectively.

(3) In response to this command from the central control station 1, each of the base stations 2, 3, and 5 receives the transmitted radio waves of the traffic channel used for the communication of the mobile station 10 specified by the command from the central control station 1, measures the receiving level for this traffic channel, and reports the measured receiving level to the central control station 1.

(4) Then, the central control station 10 selects the base station for which the reported receiving level is the highest among the base stations 2, 3, and 5. In this exemplary case, the base station 3 will have the highest receiving level as the mobile station 10 is moving into the cell 7.

Next, the central control station 10 commands the selected base station 3 to report its idle traffic channel #N which is available for the handover of the communication of the mobile station 10.

(6) In response to this command from the central control station 1, the base station 3 reports the idle traffic channel #N to the central control station 1.

(7) Then, the central control station I commands the base station 4 to send a command signal for the handover to the traffic channel #N to the mobile station 10. Meanwhile, the central control station 1 also commands the base station 3 to activate the transmitter-receiver for the traffic channel #N, while switching the active land transmission line from that connected to the base station 4 to that connected to the base station 3.

(8) In response to the command from the central control station 1, the base station 4 sends the command signal for the handover to the mobile station 10.

(9) In response to the command signal from the base station 4, the mobile station 10 switches its traffic channel to the traffic channel #N specified by the command signal, so as to establish the communication through the base station 3.

Now, in addition to the increase of capacities and sizes of each base station and the central control station and the complication of configurations of the base stations and the central control station already mentioned above, such a conventional method of handover in the cellular system has a drawback that it is quite time consuming as it requires several signal exchanges between the central control station 1 and the base stations after the lowering of the receiving level is detected at the base station 4 in order to complete the handover operation.

As a consequence, in a case the cell radius is made smaller, it becomes possible for the mobile station to move further onto the next neighboring cell before the handover operation from one cell to its neighboring cell is completed, such that the highly undesirable failure of the handover of the communication could occur in the cellular system. To eliminate such a possibility for the failure of the handover, the cell radius cannot be made smaller than a certain limit value, and this limitation on the cell radius in turn creates an upper limit to the efficient frequency spectrum utilization.

Moreover, when the mobile stations with higher moving capability such automobile telephones and the mobile stations with lower moving capability such as portable telephones are involved in such a conventional cellular system together, the cell radius must be determined in accordance with the automobile telephones which can move faster, in order to prevent the occurrence of the failure of the handover, even though the cell radius so determined is not capable of achieving the highest frequency spectrum utilization efficiency for the portable telephones. Consequently, the base station such as that located in a heavily populated area where a number of portable telephone subscribers is large needs to have a large number of traffic channels assigned, but this in turn lowers the frequency spectrum utilization efficiency further.

On the other hand, when the cell radius is determined in accordance with the portable telephones, it becomes difficult for the system to handle the frequent handover operations required by the communication of the portable telephone used on a fast moving object such as an automobile.

In addition, as the cell radius becomes smaller, an area between neighboring cells which is not well served by any cell may appear, and also the quality of service will be lowered drastically as soon as the mobile station moves out of the area covered by the cells, such that there is a great possibility for the subscribed portable telephone user to suffer from the poor quality of service.

Now, in a mobile radio communication, the radio transmission characteristic is quite adverse because of the large receiving level fluctuation and other causes, such that the occurrence of errors in the transmission signals is unavoidable. For this reason, the mobile radio communication system utilizes various error correction mechanisms. However, these error correction mechanisms are effective only with respect to the instantaneous fluctuation of the receiving level, and not very effective with respect to the relatively gradual variation of the receiving level caused by the shadowing of the transmission path due to the terrain and environmental features.

To such a relatively gradual variation of the receiving level, a so called route diversity reception in which the transmitted radio waves received by a plurality of base stations are utilized is known to be effective. For instance, the automobile telephone of NTT (Nippon Telegraph and Telephone) Corporation utilizes the base station route diversity reception for the control channel.

More specifically, a conventional route diversity reception is achieved as follows.

Namely, a conventional mobile radio communication system utilizing the route diversity reception has a configuration shown in FIG. 2, where the system includes a central control station 21 and a plurality of base stations 22 to 28 each of which is connected with the central control station 21 through land transmission lines 29 to 35, respectively.

In this mobile radio communication system, a signal transmitted from each of the base stations 22 to 28 to the central control station 21 has a format shown in FIG. 3 which includes a transmission signal 36 from a mobile station and an encoded receiving level information 37 indicating the receiving level at each base station. In other words, each base station relays the transmission signal 36 from the mobile station to the central control station 21 by attaching the receiving level information 37 to the transmission signal 36.

The central control station 21 then selects the base station for which the receiving level is the highest among all the base stations 22 to 28, and uses the transmission signal 36 transmitted from this selected base station as the transmission signal 36 received from the mobile station.

Such a conventional mobile radio communication system has drawbacks that the expensive land transmission line must be provided between the central control station 21 and each one of a plurality of the base stations and that the control function of the central control station 21 inevitably becomes complicated as a consequence of utilizing the route diversity reception.

SUMMARY OF THE INVENTION

It is therefore an object of the present invention to provide a method of handover in a mobile radio communication which is less time consuming such that the smaller cell radius can be used so as to improve the frequency spectrum utilization efficiency, and capable of securing the high quality of service regardless of the moving speed of the mobile station.

It is also an object of the present invention to provide a method of route diversity in a mobile radio communication which can be realized less expensively, without requiring additional control function which complicates the central control station.

According to one aspect of the present invention there is provided a method of handover in a mobile radio communication using a cellular system formed by a plurality of base stations, the method comprising the steps of: providing a loop transmission line by which each base station is connected with neighboring base stations; transmitting a handover information through the loop transmission line, where the handover information is relayed by each base station from one of the neighboring base stations to another one of the neighboring base station; and carrying out the handover of a communication of a mobile station from one traffic channel of one base station to an idle traffic channel of another base station by using the handover information transmitted through the loop transmission line.

According to another aspect of the present invention there is provided a method of handover in a mobile radio communication using a cellular system formed by a plurality of control base stations each of which is covering a cell within a service area of the system, a plurality of base stations each of which is covering a mini-cell within a cell area of the cell covered by each of the control base stations, the method comprising the steps of: providing a loop transmission line by which a control base station and each base station are connected with neighboring base stations; transmitting a handover information through the loop transmission line, where the handover information is relayed by each base station from one of the neighboring base stations to another one of the neighboring base station; and carrying out the handover of a communication of a mobile station from one traffic channel of one base station to an idle traffic channel of another base station by using the handover information transmitted through the loop transmission line when a mobile station moves from one mini-cell to another mini-cell.

According to another aspect of the present invention there is provided a method of handover in a mobile radio communication using a cellular system formed by a plurality of base stations, the method comprising the steps of: providing a loop transmission line by which each base station is connected with neighboring base stations; monitoring at a mobile station a receiving quality at each of the base stations in a control channel during idle periods of a currently used traffic channel in order to determine a destination base station for the handover; transmitting a handover information through the loop transmission line, where the handover information is relayed by each base station from one of the neighboring base stations to another one of the neighboring base station; and carrying out the handover of a communication of a mobile station from the currently used traffic channel of a currently used base station to an idle traffic channel of the destination base station determined by the mobile station by using the handover information transmitted through the loop transmission line.

According to another aspect of the present invention there is provided a method of route diversity in a mobile radio communication using a cellular system formed by a central control station and a plurality of base stations, the method comprising the steps of: providing an inter-station transmission line by which each base station is connected with neighboring base stations and to which the central control station is connected at an end in a signal transmission direction; receiving radio waves from a mobile station and measuring a receiving quality for the radio waves from the mobile station at each base station; and transmitting a receiving quality information indicating a currently highest receiving quality obtained by the base stations and a transmission signal representing the radio waves from the mobile station received at the highest receiving level, the receiving level information and the transmission signal being updated at each base station such that the receiving quality information received by the central control station is the highest receiving quality among the receiving qualities obtained by all the base stations.

Other features and advantages of the present invention will become apparent from the following description taken in conjunction with the accompanying drawings.

BRIEF DESCRIPTION OF THE DRAWINGS

FIG. 8 is a diagram of another format for a destination base station signal transmitted from each base station through the loop transmission line in the system of FIG. 4.

FIG. 9 is a diagram of another format for an original base station signal and a destination base station signal transmitted from each base station to the loop transmission line in the system of FIG. 4.

FIG. 19 is a timing diagram for an operation of a mobile station in a fifth embodiment of a mobile radio communication system in a form of a cellular system using a method of handover according to the present invention.

FIG. 20 is a diagram of a format for a control station signal transmitted through the loop transmission line in the system of the fifth embodiment.

FIG. 21 is a diagram of a format for a mobile station signal transmitted through the loop transmission line in the system of the fifth embodiment.

FIG. 22 is a diagram of a format for a control channel signal transmitted through the loop transmission line in the system of the fifth embodiment.

DETAILED DESCRIPTION OF THE PREFERRED EMBODIMENTS

Figure 1:
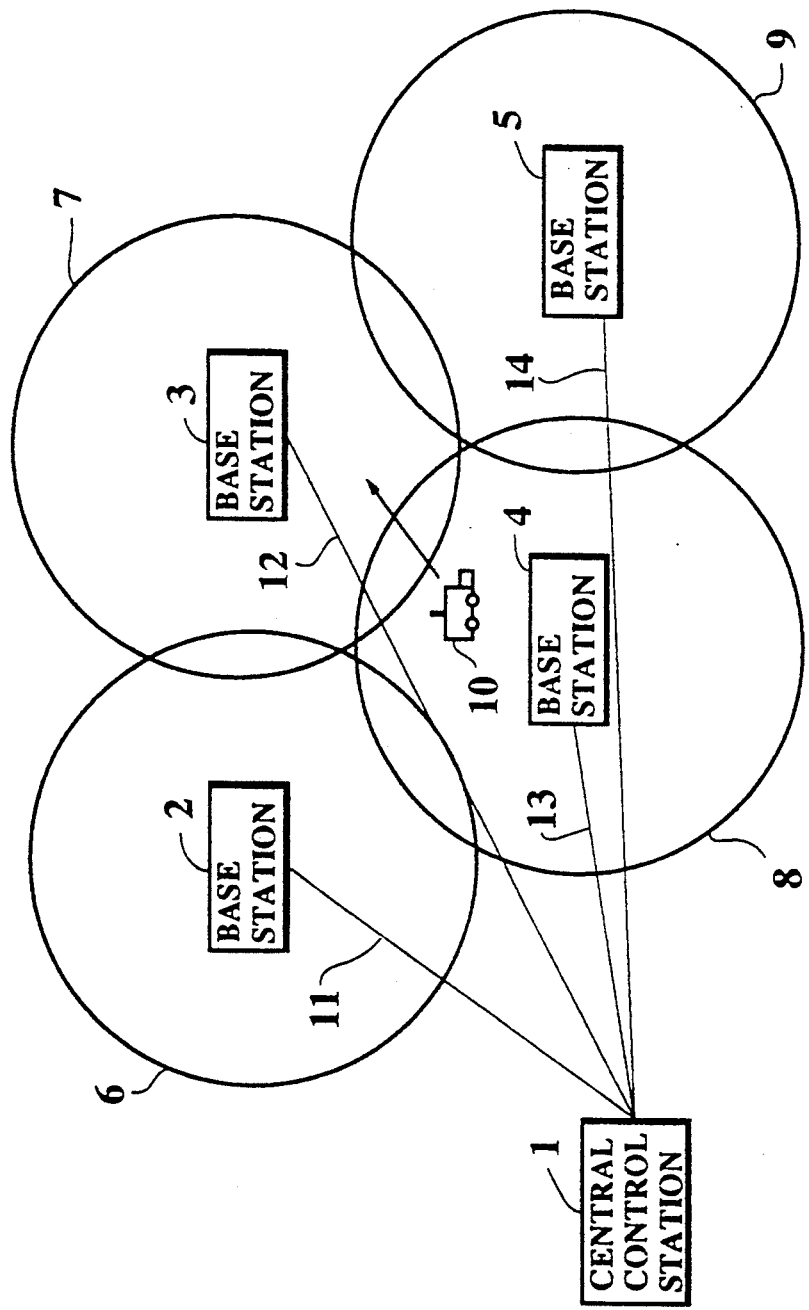
FIG. 1 is a schematic diagram of a conventional mobile radio communication system in a form of a cellular system.
Figure 2:
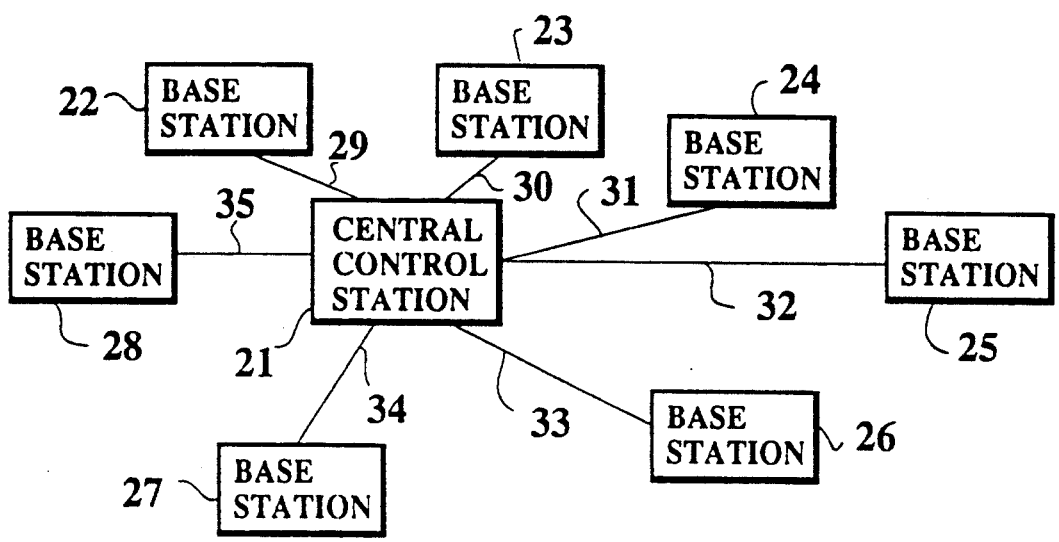
FIG. 2 is a schematic diagram of a conventional mobile radio communication system utilizing a route diversity.
Figure 3:
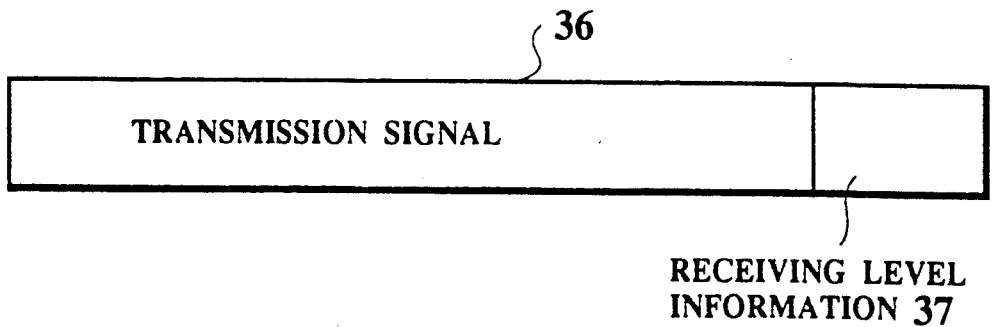
FIG. 3 is a diagram of a format for a signal transmitted from each base station to a central control station in the system of FIG. 2.
Figure 4:
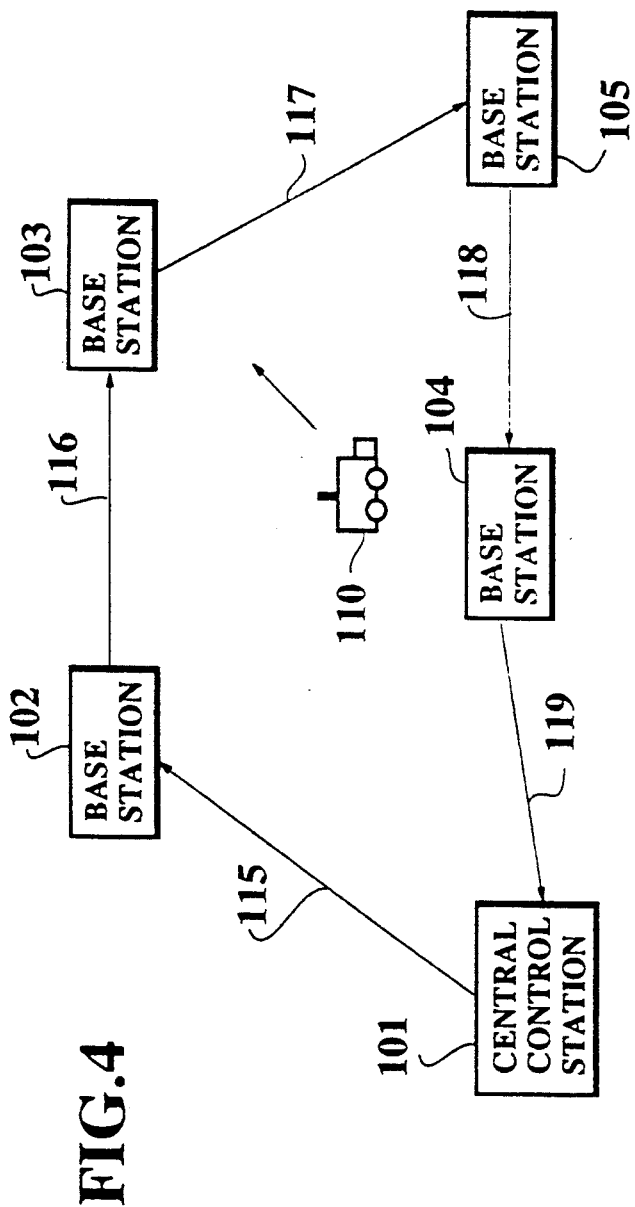
FIG. 4 is a schematic diagram of a first embodiment of a mobile radio communication system in a form of a cellular system using a method of handover according to the present invention.

Referring now to FIG. 4, a first embodiment of a mobile radio communication system using a method of handover according to the present invention will be described in detail.

In this first embodiment, the system comprises a central control station 101 and a plurality (four in FIG. 4) of base stations 102 to 105, which are connected through a loop transmission line formed by a transmission line element 115 connecting between the central control station 101 and the base station 102, a transmission line element 116 connecting between the base stations 102 and 103, a transmission line element 117 connecting between the base stations 103 and 105, a transmission line element 118 connecting between the base stations 105 and 104, and a transmission line element 119 connecting between the base station 104 and the central control station 101.

Figure 5:
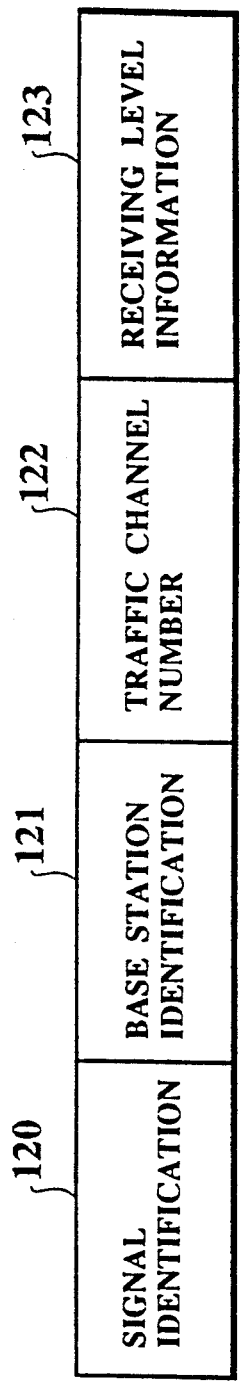
FIG. 5 is a diagram of a format for an original base station signal transmitted from each base station through a loop transmission line in the system of FIG. 4.

In this system of the first embodiment, while the mobile station 110 is communicating through one of the base station, that base station outputs an original base station signal to this loop transmission line of the system in a format shown in FIG. 5, where the original base station signal includes a signal identification 120 identifying the type of the signal transmitted (i.e., that it is the original base station signal), a base station identification 121 identifying the base station from which this original base station signal is transmitted (i.e., that base station itself), a traffic channel number 122 indicating the traffic channel currently used for the communication of the mobile station 110 at that base station, and a receiving level information 123 indicating the receiving level of the transmitted radio waves from the mobile station 110 at that base station.

Figure 6:
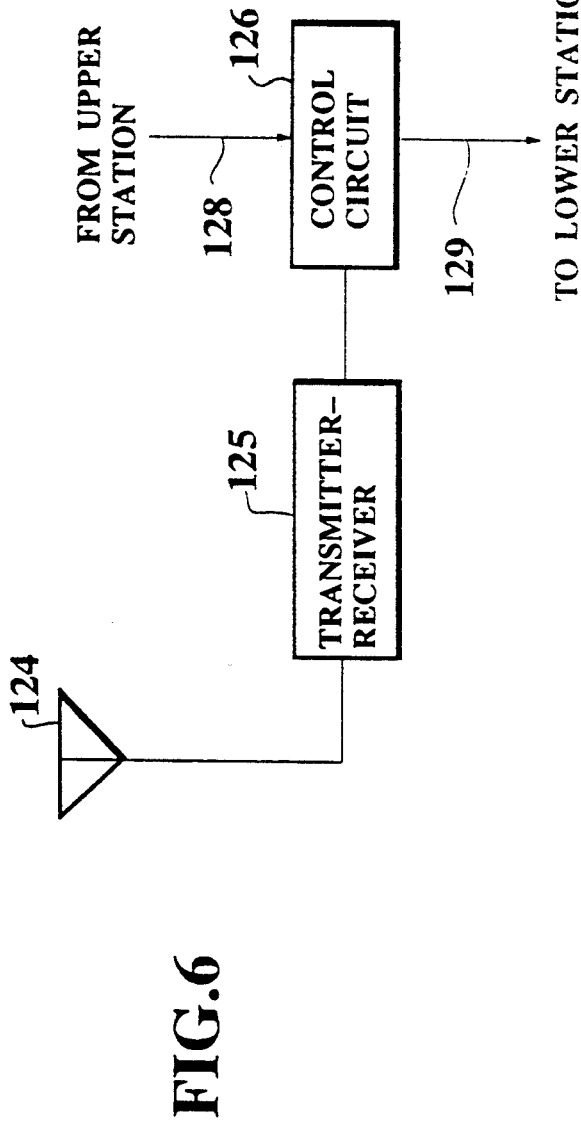
FIG. 6 is a schematic diagram of a configuration of each base station in the system of FIG. 4.

Each of the base stations 102 to 105 has a schematic configuration shown in FIG. 6, where the base station comprises an antenna 124 for transmitting and receiving the radio waves to and from the mobile station 110, a transmitter-receiver 125 for supplying the transmission signal to the antenna 124 and receiving the transmitted signal from the antenna 124, a control circuit 126, a transmission line element 128 for receiving signals from an upper station through the loop transmission line, and a transmission line element 129 for transmitting signals to a lower station through the loop transmission line. Here, each of the base stations 102 to 105 has a predetermined number of traffic channels assigned according to the traffic demand of each cell area.

In this configuration, the control circuit 126 of each base station generates the signal identification 120, the base station identification 121, the traffic channel number 122, and the receiving level information 123 for one of the traffic channel through which the mobile station 110 is currently communicating, and outputs the original base station signal in a format of FIG. 5 to the loop transmission line of the system through the transmission line element 129.

On the other hand, from the transmission line element 128, the similar original base station signal in a format of FIG. 5 outputted by the upper station is transmitted to each base station. Each base station relays such original base station signals transmitted from the upper station to the loop transmission line through the-transmission line element 129.

In addition, in this system, for each base station, the base stations which are neighboring this base station such that the handover from this base station may occur are determined in advance, and the control circuit 126 of each base station memorizes the base stations for which this base station has such neighboring relationships.

When the original base station signal in a format of FIG. 5 transmitted through the loop transmission line is received through the transmission line element 128, each base station determines whether this original base station signal is transmitted from one of the base stations with which it is in the neighboring relationships. If so, the base station starts receiving the traffic channel specified by the traffic channel number 122 of that original base station signal and measures the receiving level for that traffic channel.

In a case the measured receiving level is higher than the receiving level indicated by the receiving level information 123 of that original base station signal, the base station judges that the mobile station 110 has moved into the cell area of its own cell. In this case, the base station outputs a destination base station signal indicating its own base station identification, its own idle traffic channel number, and the base station identification of the original base station from which the mobile station 110 is moving out. Here, in a case there is no idle traffic channel available in that base station, the destination base station signal will not be generated.

Figure 7:
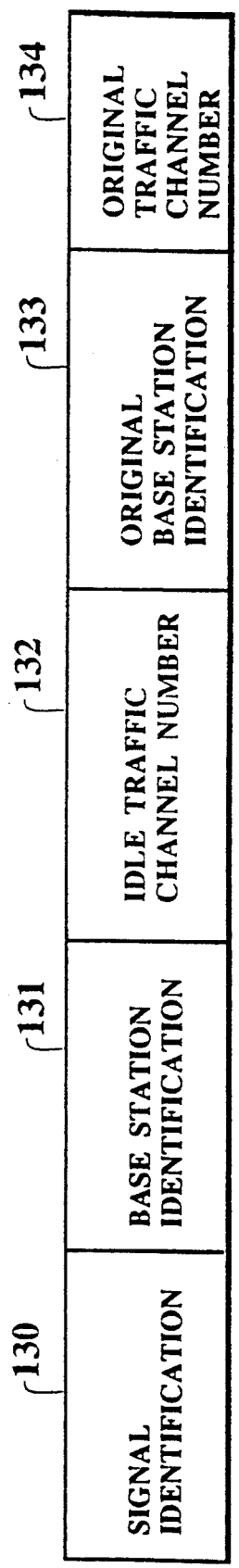
FIG. 7 is a diagram of one format for a destination base station signal transmitted from each base station through the loop transmission line in the system of FIG. 4.

This destination base station signal can be in a format shown in FIG. 7. In this format shown in FIG. 7, the destination base station signal includes a signal identification 130 identifying the type of the signal transmitted (i.e., that it is the destination base station signal), a base station identification 131 identifying the base station from which this destination base station signal is transmitted (i.e., that base station itself), an idle traffic channel number 132 indicating the idle traffic channel available at that base station, an original base station identification 133 identifying the original base station from which the mobile station 110 is moving out, and an original traffic channel number 134 indicating the traffic channel used for the communication of the mobile station 110 at the original base station.

Alternatively, the destination base station signal may be in a format shown in FIG. 8, in which the destination base station signal in the first format of FIG. 7 is attached behind the original base station signal in a format of FIG. 5 such that the original base station signal and the destination base station signal are transmitted together when the original base station signal is to be relayed to the loop transmission line. Here, the signal identification 130 may be omitted as it is meaningless in this format, and the original base station identification 133 and the original traffic channel number 134 may be omitted as they overlap with the base station identification 121 and the traffic channel number 122.

Alternatively, the destination base station signal may be in a format shown in FIG. 9, where the destination base station signal includes the signal identification 120 identifying the type of the signal transmitted, the base station identification 121 identifying the base station from which this destination base station signal is transmitted, the traffic channel number 122 indicating the traffic channel currently used for the communication of the mobile station 110, a measuring base station identification 135 identifying the base station at which the highest receiving level for the traffic channel specified by the traffic channel number 122 is measured up to then, a measured receiving level information 136 indicating the receiving level of the transmitted radio waves from the mobile station 110 at the base station identified by the measuring base station identification 135, and the idle traffic channel number 132 indicating the idle traffic channel available at the base station identified by the measuring base station identification 135.

When this format of FIG. 9 is adopted, the original base station outputs the original base station signal also in this format of FIG. 9, where the measuring base station identification 135 is identical to the base station identification 121 initially, and the receiving level information 123 in the format of FIG. 5 is replaced by the measured receiving level information 136 in the format of FIG. 9.

Then, at each base station which receives the original base station signal in a format of FIG. 9, the receiving level for the traffic channel specified by the traffic channel number 122 is measured and compared with the receiving level indicated by the measured receiving level information 136. When the receiving level measured at that base station is less than the receiving level indicated by the measured receiving level information 136, the transmitted original base station signal is relayed to the loop transmission line without any change as the destination base station signal at that base station. On the other hand when the receiving level measured at that base station is greater than the receiving level indicated by the measured receiving level information 136, the measuring base station identification is changed to the base station identification of that base station, and the measured receiving level information 136 is changed to the receiving level measured at that base station, while the idle traffic channel number 132 is registered, before being transmitted as the destination base station signal to the loop transmission line.

When such a destination base station signal returns back to the original base station after circulating around the loop transmission line, the original base station determines the destination base station and the idle traffic channel in this destination base station from the destination base station signal, and transmits a handover command signal to the mobile station 110 so as to command the mobile station 110 to carry out the handover of its communication to the idle traffic channel of the destination base station determined from the destination base station signal.

Here, it is noted that in this first embodiment, each base station does not assign the traffic channel which is registered as the idle traffic channel number 132 in the destination base station signal to any communication until the final determination of the destination base station and the handover traffic channel.

Now, assuming that the mobile station 110 is communicating through the base station 104, and moving out from the cell area of this base station 104, the base station 104 generates and outputs the original base station signal described above to the loop transmission line. Then, assuming that the base station 103 received the radio waves from the mobile station 110 at the highest receiving level and reported its idle traffic channel #N in the destination base station signal which is subsequently transmitted to the original base station 104, the handover operation will proceed as follows.

(1) The base station 104 notifies the central control station 101 through the loop transmission line that the base station 103 is determined as the destination base station.

(2) In response to this notification from the base station 104, the central control station 101 notifies the base station 103 through the loop transmission line that it is determined as the destination base station for the handover, while also notifying the other base stations through the loop transmission line that they are not determined as the destination base station for the handover.

(3) The base station 104 transmits a handover command signal to the mobile station 110 so as to command the mobile station 110 to carry out the handover of its communication to the idle traffic channel #N of the destination base station 103.

(4) Then, the base station 103 activates the transmitter-receiver for the traffic channel #N, while notifying the central control station 101 through the loop transmission line that the handover of the communication of the mobile station 110 from the base station 104 to the traffic channel #N of the base station 103 has been completed.

In this first embodiment, when the idle traffic channel registered by a certain base station is rewritten at another subsequent base station, that certain base station cannot know that the idle traffic channel it registered has been rewritten at a time of rewriting. However, each base station can recognize whether the idle traffic channel it registered is going to be the handover traffic channel or not as the central control station 101 notifies each base station as to whether it is determined as the destination base station for the handover or not.

Thus, according this first embodiment, it becomes possible to establish a so called decentralized autonomous control in the cellular system in which each base station monitors the traffic channels of the other base stations, judges whether the mobile station is moving into its own cell area, and transmits its idle traffic channel to the original base station without any command from the central control station, such that the handover operation can be carried out less time consumingly compared with a conventional cellular system without increasing the capacities and sizes of each base station and the central control station and complicating the configurations of the base stations and the central control station. As a consequence, it becomes possible to use the smaller cell radius so as to improve the frequency spectrum utilization efficiency, and to secure the high quality of service regardless of the moving speed of the mobile station.

Figure 10:
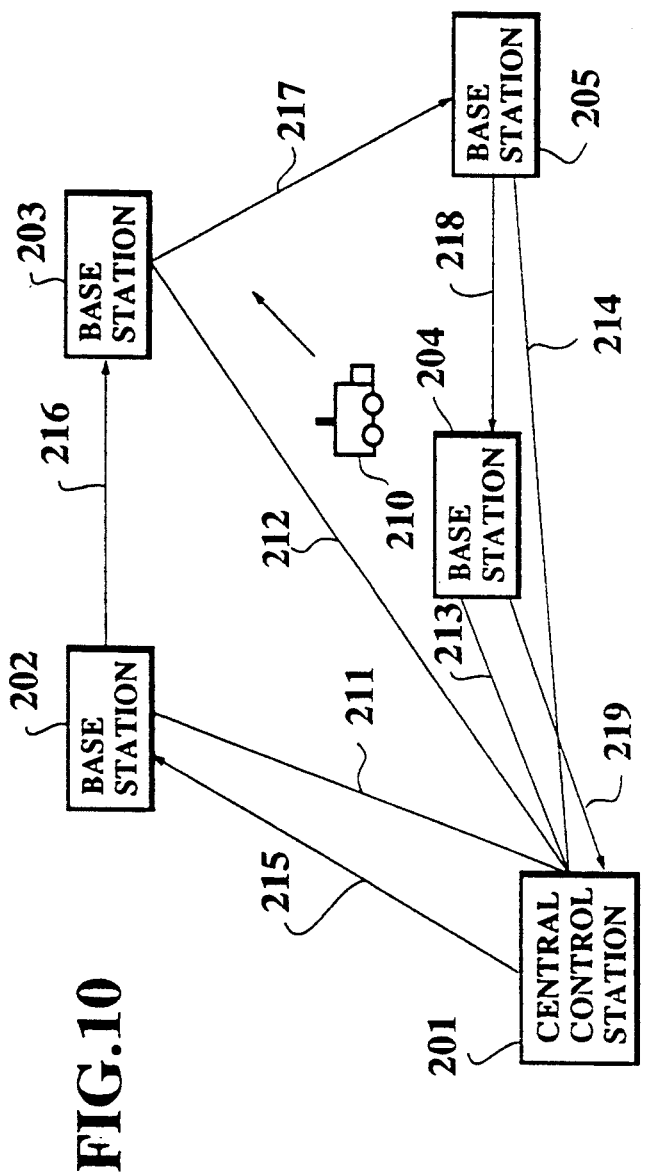
FIG. 10 is a schematic diagram of a second embodiment of a mobile radio communication system in a form of a cellular system using a method of handover according to the present invention.

Referring now to FIG. 10, a second embodiment of a mobile radio communication system using a method of handover according to the present invention will be described in detail.

In this second embodiment, the system comprises a central control station 201 and a plurality (four in FIG. 10) of base stations 202 to 205, which are connected through a loop transmission line formed by a transmission line element 215 connecting between the central control station 201 and the base station 202, a transmission line element 216 connecting between the base stations 202 and 203, a transmission line element 217 connecting between the base stations 203 and 205, a transmission line element 218 connecting between the base stations 205 and 204, and a transmission line element 219 connecting between the base station 204 and the central control station 201.

In addition, the base stations 202 to 205 are directly connected with the central control station 201 through land transmission lines 211 to 214, respectively, besides the loop transmission line.

Figure 11:
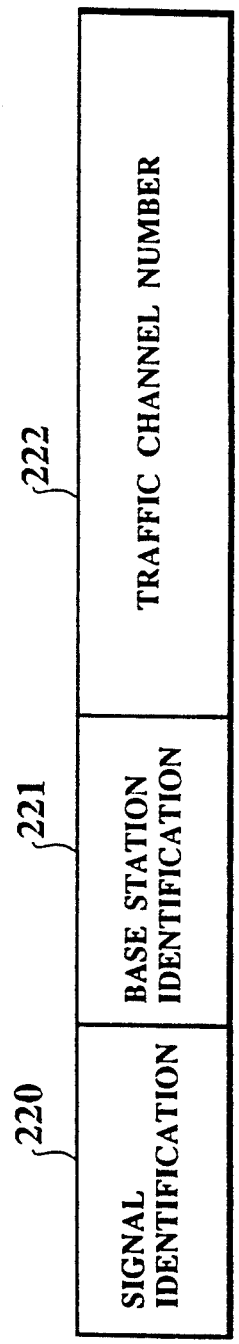
FIG. 11 is a diagram of a format for an original base station signal transmitted from each base station through a loop transmission line in the system of FIG. 10.

In this system of the second embodiment, while the mobile station 210 is communicating through one of the base station, that base station outputs an original base station signal to this loop transmission line of the system in a format shown in FIG. 11, where the original base station signal includes a receiving level detection request 220 indicating the request for monitoring the receiving level, a base station identification 221 identifying the base station from which this original base station signal is transmitted (i.e., that base station itself), and a traffic channel number 222 indicating the traffic channel currently used for the communication of the mobile station 210 at that base station.

Figure 12:
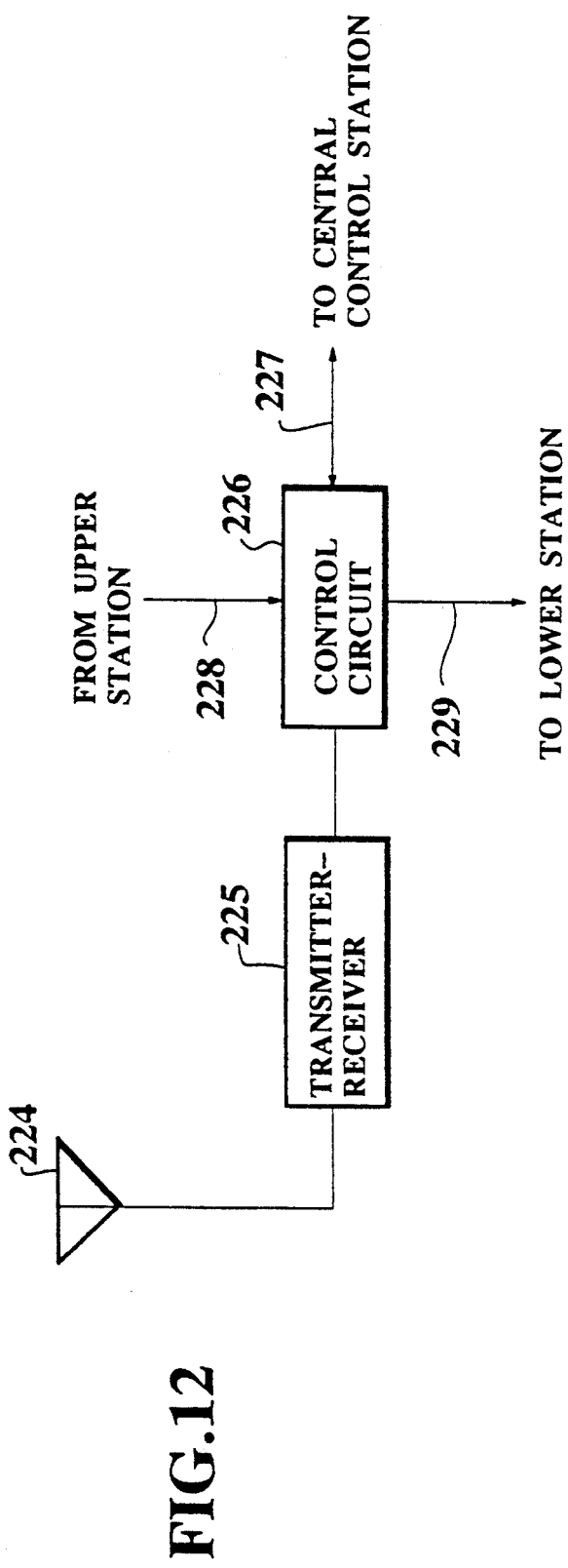
FIG. 12 is a schematic diagram of a configuration of each base station in the system of FIG. 10.

Each of the base stations 202 to 205 has a schematic configuration shown in FIG. 12, where the base station comprises an antenna 224 for transmitting and receiving the radio waves to and from the mobile station 210, a transmitter-receiver 225 for supplying the transmission signal to the antenna 224 and receiving the transmitted signal from the antenna 224, a control circuit 226, a transmission line element 227 for transmitting and receiving signals to and from the central control station 201 through the land transmission line, a transmission line element 228 for receiving signals from an upper station through the loop transmission line, and a transmission line element 229 for transmitting signals to a lower station through the loop transmission line. Here, each of the base stations 202 to 205 has a predetermined number of traffic channels assigned according to the traffic demand of each cell area.

In this configuration, the control circuit 226 of each base station monitors the receiving level of the traffic channel used for the communication of the mobile station 210 and recognize that the mobile station 210 is moving out from its cell area so that the handover operation is necessary when the receiving level decreases below the specific level, in which case the handover operation is requested to the control circuit 226. In response, the control circuit 226 generates the receiving level detection request 220, the base station identification 221, and the traffic channel number 222 for one of the traffic channel through which the mobile station 210 is currently communicating, and outputs the original base station signal in a format of FIG. 11 to the loop transmission line of the system through the transmission line element 229.

On the other hand, from the transmission line element 228, the similar original base station signal in a format of FIG. 11 outputted by the upper station is transmitted to each base station. Each base station relays such original base station signals transmitted from the upper station to the loop transmission line through the transmission line element 229.

Thus, the original base station signal transmitted from the original base station to the loop transmission line will subsequently be relayed through the base stations 202 to 205 and the central control station 201 until it returns back to the original base station.

In addition, in this system, for each base station, the base stations which are neighboring this base station such that the handover from this base station may occur are determined in advance, and the control circuit 226 of each base station memorizes the base stations for which this base station has such neighboring relationships. For instance, in FIG. 10, the base station 203 has the neighboring relationships with the base station 202, 204, and 205, while the base station 205 has the neighboring relationships with the base station 203 and 204.

When the original base station signal in a format of FIG. 11 transmitted through the loop transmission line is received through the transmission line element 228, each base station determines whether this original base station signal is transmitted from one of the base stations with which it is in the neighboring relationships. If so, the base station starts receiving the traffic channel specified by the traffic channel number 222 of that original base station signal and measures the receiving level for that traffic channel. For instance, in FIG. 10, if the original base station is the base station 202, the base stations 203 and 204 will be judged as the neighboring base stations of the original base station 202 so that they will start measuring the receiving level for that traffic channel as soon as the original base station signal is relayed to them, whereas the base station 205 will be judged as not a neighboring base station of the original base station 202, so that it will only relay the original base station signal to the loop transmission line.

Figure 13:
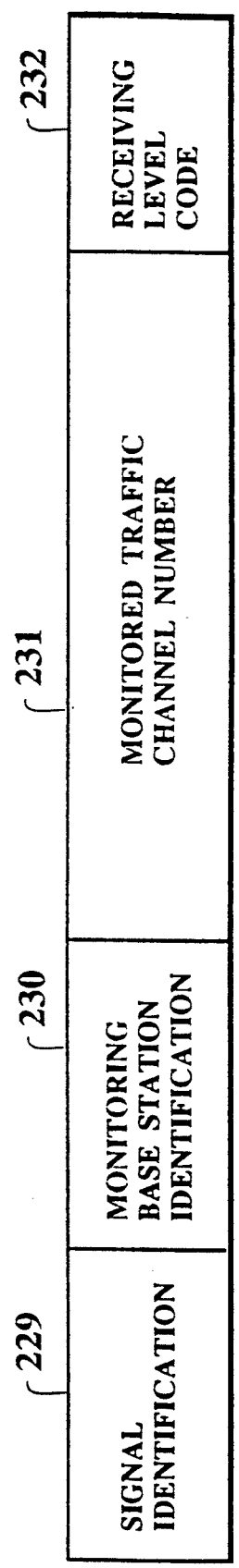
FIG. 13 is a diagram of a format for a receiving level report signal transmitted from each base station through the loop transmission line in the system of FIG. 10.

The base station which is judged as the neighboring base station of the original base station then outputs a receiving level report signal in a format shown in FIG. 13, where the receiving level report signal includes a signal identification 229 identifying that it is the receiving level report signal, a monitoring base station identification 230 identifying the base station which measured the receiving level (i.e., that base station itself), a monitored traffic channel number 231 indicating the traffic channel monitored by that base station, and a receiving level code 232 indicating the receiving level obtained for the monitored traffic channel in an encoded form.

The central control station 201 compares the receiving level indicated by the receiving level code 232 of the receiving level report signals transmitted through the loop transmission line from the base stations, and selects the base station for which the receiving level indicated by the receiving level code 232 In the receiving level report signal is the highest as the destination base station for the handover.

Hereafter, the central control station 201 controls the cellular system substantially similarly to the case of the handover operation in a conventional cellular system.

Thus, according this second embodiment, it becomes possible to establish a partially decentralized autonomous control in the cellular system in which each base station monitors the traffic channels of the other base stations without any command from the central control station, such that the handover operation can be carried out less time consumingly compared with a conventional cellular system without increasing the capacities and sizes of each base station and the central control station and complicating the configurations of the base stations and the central control station. As a consequence, it becomes possible to use the smaller cell radius so as to improve the frequency spectrum utilization efficiency, and to secure the high quality of service regardless of the moving speed of the mobile station.

Figure 14:
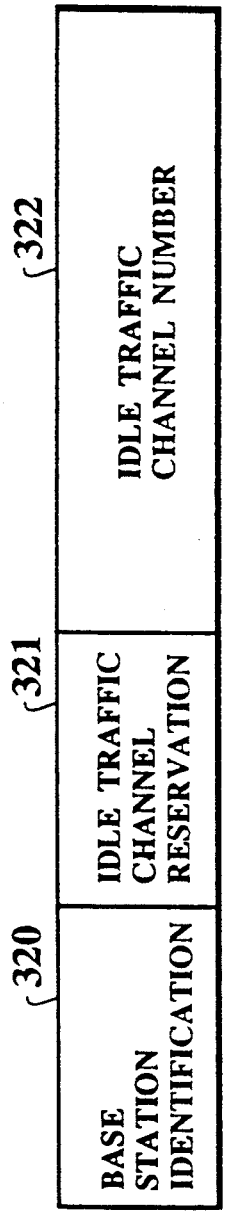
FIG. 14 is a diagram of a format for an idle traffic channel signal transmitted from each base station through the loop transmission line in a third embodiment of a mobile radio communication system in a form of a cellular system using a method of handover according to the present invention.
Figure 15:
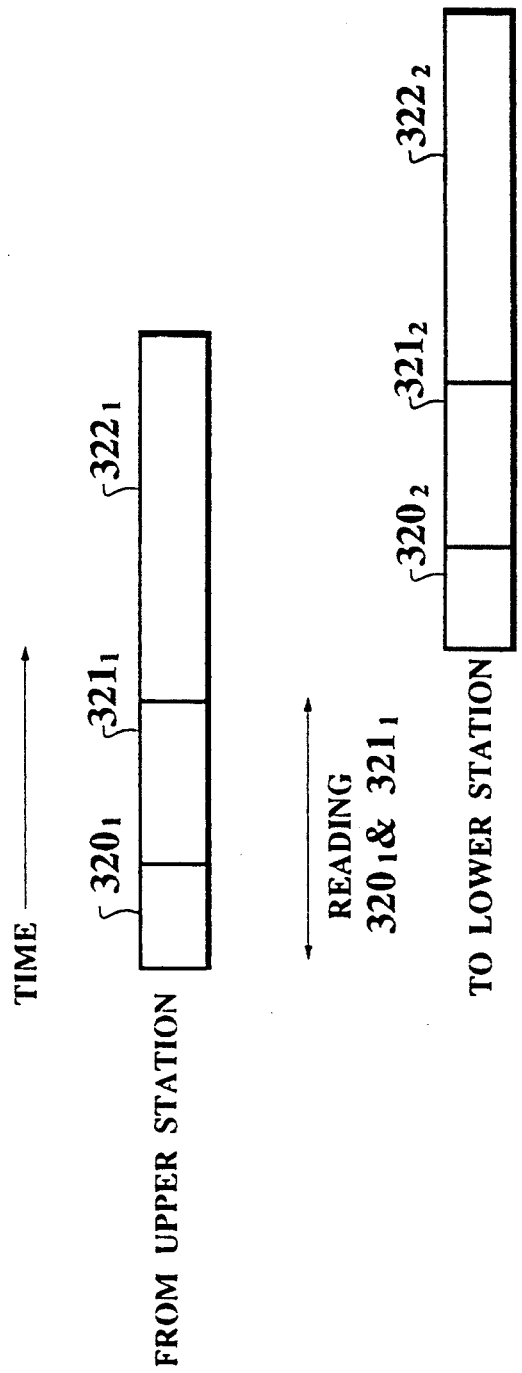
FIG. 15 is a timing diagram for a case of relaying the idle traffic channel signal of FIG. 14 at each base station.

Referring now to FIGS. 14 and 15, a third embodiment of a mobile radio communication system using a method of handover according to the present invention will be described in detail.

In this third embodiment, the system configuration is substantially the same as that of the second embodiment shown in FIG. 10. Also, each of the base stations has a configuration substantially the same as that of the second embodiment shown in FIG. 12.

Now in this third embodiment, each base station outputs an idle traffic channel signal to the loop transmission line of the system in a format shown in FIG. 14, where the idle traffic channel signal includes a base station identification 320 identifying the base station from which this idle traffic channel signal is transmitted (i.e., that base station itself), an idle traffic channel number 322 indicating the idle traffic channel available at that base station, and an idle traffic channel reservation 321 indicating a presence or an absence of a reservation for the idle traffic channel indicated by the idle traffic channel number 322.

Thus, the control circuit 226 of each base station regularly generates the base station identification 320, the idle traffic channel reservation 321 which is initially set to indicate the absence of the reservation, and the idle traffic channel number 322 indicating the idle traffic channel available at that base station at a time of the generation of the idle traffic channel signal, and outputs the generated idle traffic channel signal in a format of FIG. 14 to the loop transmission line of the system through the transmission line element 229. In a case there is no idle traffic channel available at that base station at a time of generation of the idle traffic channel signal, this absence of the available idle traffic channel is indicated by the idle traffic channel number 322.

On the other hand, from the transmission line element 228, the similar idle traffic channel signal in a format of FIG. 14 outputted by the upper station is transmitted to each base station. Each base station relays such idle traffic channel signals transmitted from the upper station to the loop transmission line through the transmission line element 229.

In relaying the idle traffic channel signal from the other base station, each base station may change the idle traffic channel reservation 321 to indicate the presence of the reservation by inserting its own base station identification whenever it is judged that the idle traffic channel indicated by the idle traffic channel number 322 is needed for the handover of the communication of the mobile station 210 which is currently communicating through that base station.

Namely, as shown in FIG. 15, when the base station receives the idle traffic channel signal with the base station identification $320_1$, idle traffic channel reservation $321_1$, and idle traffic channel number $322_1$ from the upper station through the transmission line element 228, the control circuit 226 of the base station determines whether it is necessary to read the base station identification $320_1$ and the idle traffic channel reservation $321_1$ of this idle traffic channel signal, i.e., whether the idle traffic channel indicated by this idle traffic channel signal is needed for the handover at that base station. In a case it is determined to be unnecessary to read them, the control circuit 226 transmits this idle traffic channel signal unchanged, by turning the base station identification $320_1$, idle traffic channel reservation $321_1$, and idle traffic channel number $322_1$ into the base station identification $320_2$, idle traffic channel reservation $321_2$, and idle traffic channel number $322_2$ for the idle traffic channel signal to be transmitted to the lower station through the transmission line element 229. On the other hand, when it is determined to be necessary to read them, the control circuit 226 transmits this idle traffic channel signal by turning the base station identification $320_1$ into the base station identification $320_2$, and idle traffic channel number $322_1$ into and idle traffic channel number $322_2$ for the idle traffic channel signal to be transmitted to the lower station through the transmission line element 229, while replacing the idle traffic channel reservation $321_1$ by the idle traffic channel reservation $321_2$ in which the presence of the reservation is indicated by the inserted base station identification of that base station.

Thus, the idle traffic channel signal transmitted from each base station to the loop transmission line will subsequently be relayed through the base stations 202 to 205 and the central control station 201 while registering the reservation for the idle traffic channel whenever the need arises until it returns back to the base station which generated this idle traffic channel signal.

Here, each base station does not assign the traffic channel which is registered as the idle traffic channel number 322 in the idle traffic channel signal to any communication until the idle traffic channel signal returns back after circulating through the loop transmission line.

Now, assuming that the mobile station 210 is communicating through the base station 204, and moving out from the cell area of this base station 204 such that a need for the handover from the base station 204 arises, the handover operation will proceed as follows.

(1) As a distance between the base station 204 and the mobile station 210 becomes greater than the cell radius, the receiving level at the base station 204 decreases below the specific level. When this decrease of the receiving level is detected by the base station 204, the base station 204 requests the handover of the communication of the mobile station 210 to the central control station 201 through the land transmission line 213.

(2) In response to this request for the handover from the base station 204, the central control station 201 commands the neighboring base stations 202, 203, and 205 to monitor the transmitted radio waves from the mobile station 210 through the land transmission lines 211, 212, and 214, respectively.

(3) In response to this command from the central control station 201, each of the base stations 202, 203, and 205 receives the transmitted radio waves of the channel used for the communication of the mobile station 210 which is specified from the central control station 201, and measures the receiving level which is then reported to the central control station 201.

(4) Then, the central control station 201 selects the base station for which the reported receiving level is the highest among the base stations 202, 203, and 205. In this exemplary case, the base station 203 will have the highest receiving level.

Here, it is noted that these four steps (1) to (4) are substantially the same as the conventional handover operation procedure. In this third embodiment, however, these steps (1) to (4) are followed by the following steps (5) to (8).

(5) The central control station 201 commands the base station 204 to carry out the handover of the communication of the mobile station 210 to the base station 203. Meanwhile, the central control station 201 also switches the active land transmission line from that connected to the base station 204 to that connected to the base station 203, and notifies the base station 203 through the loop transmission line that it is determined as the destination base station for the handover.

(6) In response to the command for the handover from the central control station 201, the base station 204 selects the idle traffic channel signal having the base station identification 320 indicating the base station 203 among the idle traffic channel signals circulating in the loop transmission line, and reads the idle traffic channel number 322 of the selected idle traffic channel signal so as to recognize the idle traffic channel #N for the handover. Then, the base station 204 changes the idle traffic channel reservation 321 of this idle traffic channel signal to indicate the presence of the reservation for the idle traffic channel #N by inserting its own base station identification to the idle traffic channel reservation 321, and then relays this idle traffic channel signal to the lower station to the loop transmission line through the transmission line element 229.

(7) The base station 204 transmits a handover command signal to the mobile station 210 so as to command the mobile station 210 to carry out the handover of its communication to the idle traffic channel #N of the base station 203.

(8) When the idle traffic channel signal whose idle traffic channel reservation 321 has been changed by the base station 204 returns back to the base station 203 which generated this idle traffic channel signal, the base station 203 recognizes from the idle traffic channel reservation 321 of this idle traffic channel signal that the base station 204 is going to use the idle traffic channel #N for the handover, and activates the transmitter-receiver for the traffic channel #N, while notifying the central control station 201 through the loop transmission line that the handover of the communication of the mobile station 210 is going to be carried out from the base station 204 to the traffic channel #N of the base station 203, so as to complete the handover operation.

The base station 203 subsequently generates and outputs the idle traffic channel signal again, in which the traffic channel other than #N will be registered as the idle traffic channel.

In a case the idle traffic channel signal returns back to the base station which generated this idle traffic channel signal without any reservation for the idle traffic channel registered and this idle traffic channel is still available at that base channel, that base station may outputs the same idle traffic channel signal again to the loop transmission line, or the new idle traffic channel signal in which the idle traffic channel is replaced by another idle traffic channel available.

In a case one traffic channel of one destination base station happens to be potentially usable by two original base stations, the original base station which receives the idle traffic channel signal from the destination base station first will make the reservation for the idle traffic channel, so that by the time the other original base station receives this idle traffic channel signal from the destination base station, the idle traffic channel is no longer available and therefore this other original base station have to wait for the other idle traffic channel signal in which the idle traffic channel is not yet reserved. Thus, in this third embodiment, the conflict between two base stations over a single idle traffic channel of the other base station can be avoided.

Actually, the idle traffic channel reservation 321 is not absolutely indispensable in this third embodiment. In a case the idle traffic channel reservation 321 is not used in the idle traffic channel signal, it becomes possible for two original base stations requiring the handover at the same time to assign the same traffic channel of one destination base station to two different mobile stations. However, even In such a case the conflict between two base stations over a single idle traffic channel of the other base station can also be avoided by means of a loop check operation as follows.

Namely, in general, the mobile station for which a new traffic channel is assigned as a result of the handover carries out an operation called a loop check in order to confirm the correctness of the assignment of the new traffic channel. This loop check operation is carried out by exchanging a loop cheek signal including a mobile station number between the destination base station and the mobile station, and the communication through a traffic channel assigned by the handover operation cannot be started until this loop check operation is successfully completed. Thus, even when more than one original base stations assign the same traffic channel of one destination base station to two different mobile stations at the same time, only the mobile station which completed the loop check with the destination base station first can actually start communicating through the new traffic channel, and the other mobile station which inevitably fails to complete the loop check operation will have to wait for the handover to another traffic channel of the destination base station, so that the conflict between two base stations over a single idle traffic channel of the other base station can also be avoided.

Thus, according this third embodiment, it becomes possible to establish a partially decentralized autonomous control in the cellular system in which each base station monitors the idle traffic channels of the other base stations without any command from the central control station, such that the handover operation can be carried out less time consumingly compared with a conventional cellular system without increasing the capacities and sizes of each base station and the central control station and complicating the configurations of the base stations and the central control station. As a consequence, it becomes possible to use the smaller cell radius so as to improve the frequency spectrum utilization efficiency, and to secure the high quality of service regardless of the moving speed of the mobile station.

Figure 16:
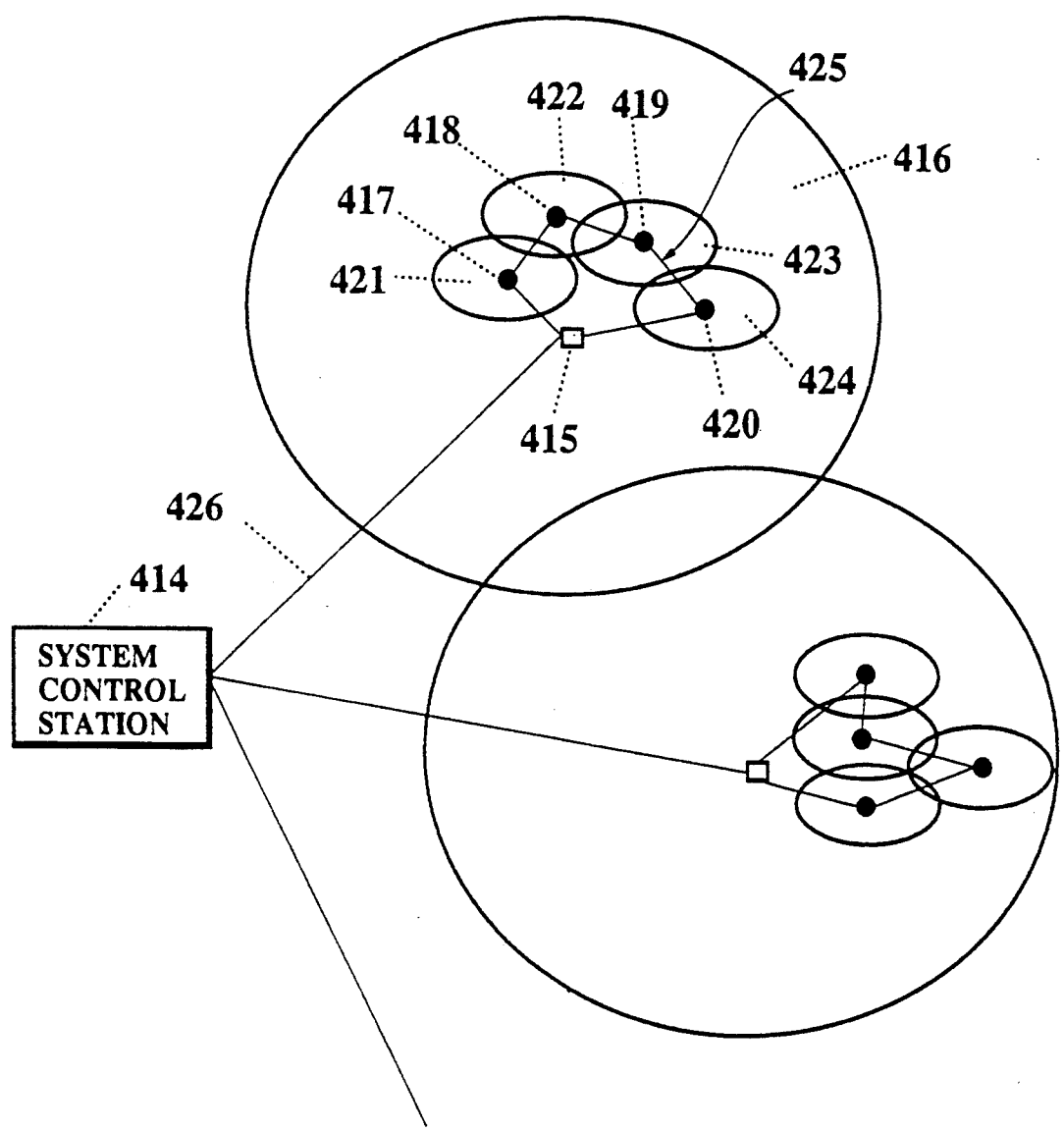
FIG. 16 is a schematic diagram of a fourth embodiment of a mobile radio communication system in a form of a cellular system using a method of handover according to the present invention.

Referring now to FIG. 16, a fourth embodiment of a mobile radio communication system using a method of handover according to the present invention will be described in detail.

In this fourth embodiment, the entire service area of the system is covered by a plurality of cells such as a cell 416. Each cell 416 has a control base station 415 which covers the entire cell area of the cell 416, and a plurality of base stations 417 to 420 covering mini-cells 421 to 424 formed within the cell area of the cell 416. The control base station 415 and the base stations 417 to 420 are connected through a loop transmission line 425 such that the mini-cells 421 to 424 are managed substantially as in the first embodiment described above with the control base station 415 playing a role of a central control station. Regions within the cell 416 which are not covered by the mini-cells 421 to 424 are covered by the control base station 415 alone. Here, each of the base stations 417 to 420 has a predetermined number of traffic channels assigned according to the traffic demand within each mini-cell, while the control base station 415 also has a predetermined number of traffic channels assigned according to the traffic demand within the cell 416.

In addition, the control base stations such as the control base station 415 are connected with a system control station 414 through land transmission lines such as a land transmission line 426, such that the handover between the control base stations are managed by the system control station 414.

In this system, each of the base stations 417 to 420 has a limited functional capacity compared with the control base station 415, so that when an excessively low receiving level or an excessively large receiving level fluctuation beyond the functional capacity of each base station is detected for a communication of a mobile station at the base station, the handover of the communication is carried out from the base station to the idle traffic channel of the control base station 415.

Figure 17:
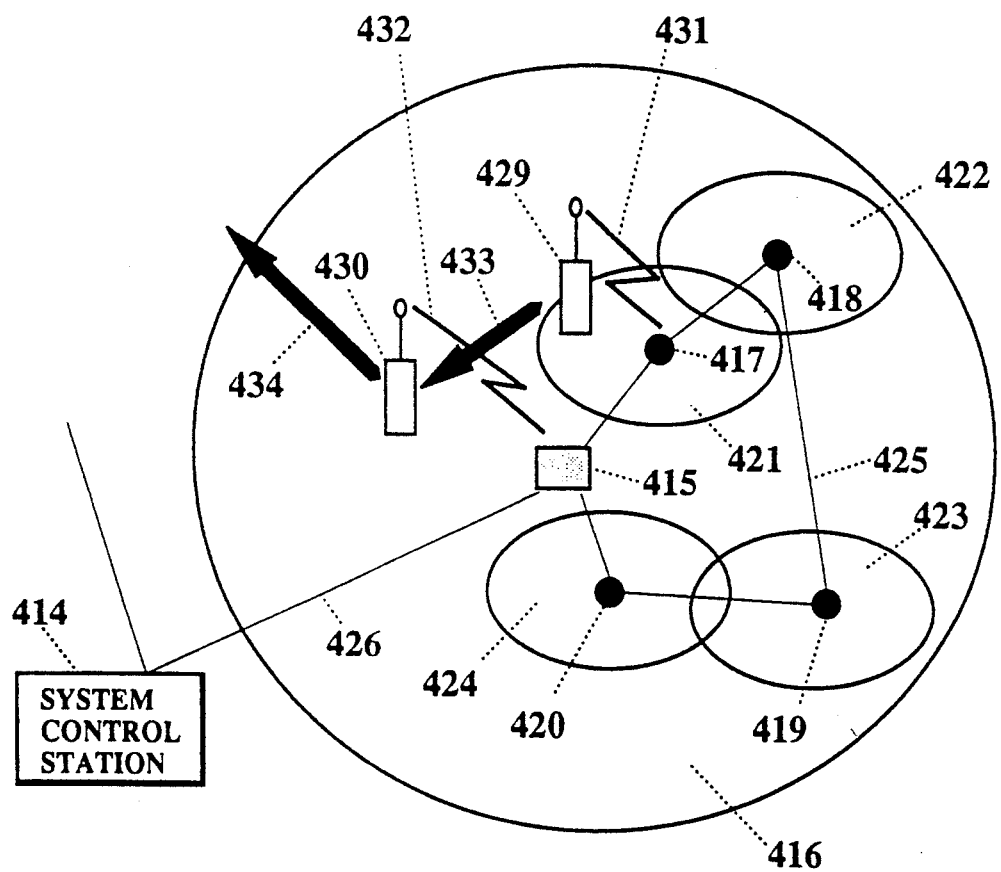
FIG. 17 is a schematic diagram of a part of the system of FIG. 16 in one exemplary situation for explaining the handover operation in the system.

Namely, as shown in FIG. 17, when the mobile station 429 located within the mini-cell 421 and making a communication 431 through the base station 417 is moving out of the mini-cell 421 by moving along an arrow 433, the receiving levels reported from the other base stations 418 to 420 through the loop transmission line 425 indicate that the receiving levels are not high enough, so that the control base station 415 commands the handover to its own idle traffic channel to the base station 417 and the mobile station 429 through the loop transmission line 425.

Similarly, when the mobile station moving within the mini-cells 421 to 424 is moving very fast, the receiving levels reported from the other base stations 418 to 420 through the loop transmission line 425 indicate that the receiving levels are excessively fluctuating, so that the control base station 415 commands the handover to its own idle traffic channel to the base station and the mobile station through the loop transmission line 425.

Also, when the mobile station 430 located outside the mini-cells 421 to 424 and making a communication 432 through the control base station 415 is moving out of the cell 416 to the neighboring cell by moving along an arrow 434, the handover is carried out between the control base station 415 and the control base station of the neighboring cell under the control of the system control station 414.

On the other hand, while the mobile station is communicating through the control base station 415, the base stations 417 to 420 monitor this communication and report the receiving level to control base station 415, such that when the receiving level at one of the base stations 417 to 420 becomes sufficiently high for the capacity of that base station, the handover of the communication is carried out from the control base station 415 to that base station.

Figure 18:
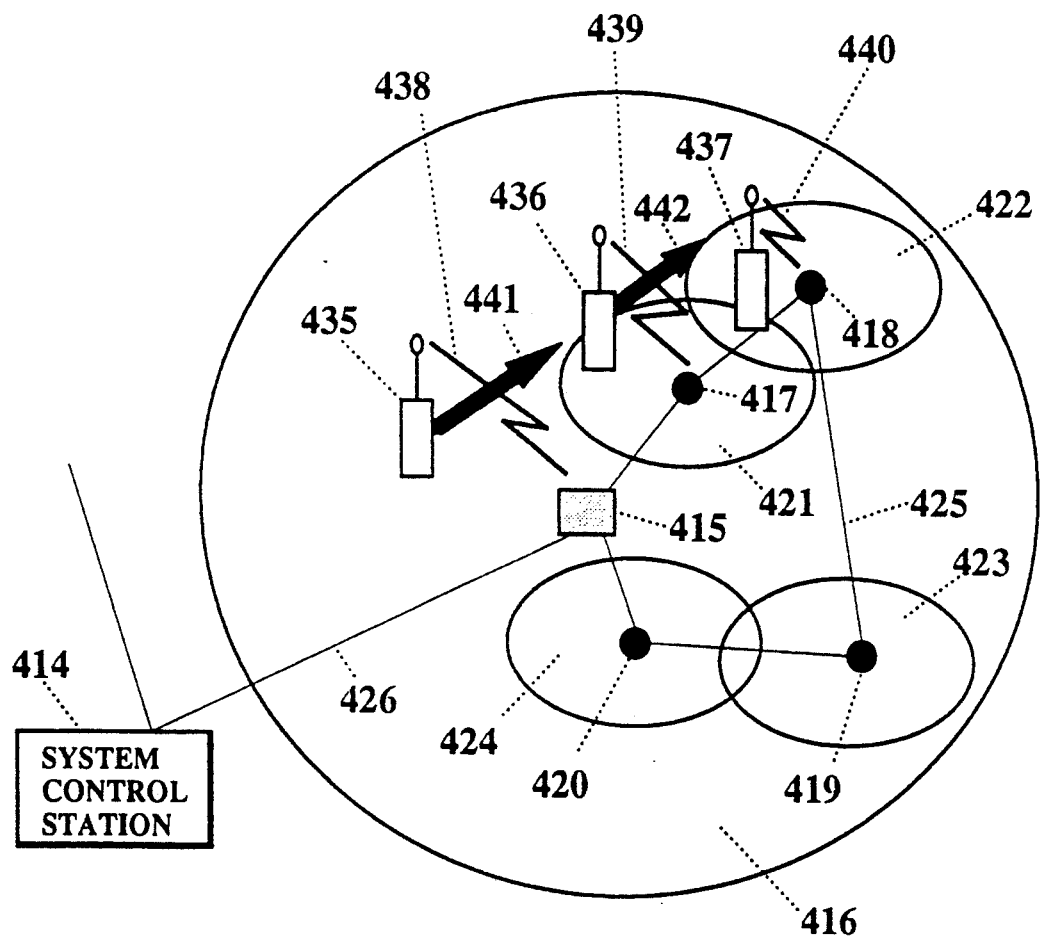
FIG. 18 is a schematic diagram of a part of the system of FIG. 16 in another exemplary situation for explaining the handover operation in the system.

Namely, as shown in FIG. 18, when the mobile station 435 located outside the mini-cells 421 to 424 and making a communication 438 through the control base station 415 is moving into the mini-cell 417 by moving along an arrow 441, the handover is carried out from the control base station 415 to the idle traffic channel of the base station 417.

When the mobile station 436 located within the mini-cell 421 and making a communication 439 through the base station 417 is moving into the neighboring mini-cell 422 by moving along an arrow 442, the control base station 415 commands the handover from the base station 417 to the base station 418 as in the first embodiment described above.

Here, however, when the mobile station moving within the mini-cells 421 to 424 is moving very fast, the receiving levels reported from the other base stations 418 to 420 through the loop transmission line 425 indicate that the receiving levels are excessively fluctuating, so that the control base station 415 continues to maintain the communication of the mobile station without commanding the handover to the base stations 417 to 420.

Thus, according to this fourth embodiment, the mobile station communicates through the base station of a mini-cell as much as possible, so that the improved frequency spectrum utilization efficiency can be achieved. In addition, the mini-cells are enclosed within a larger size cell covered by a control base station, such that the regions around the mini-cells and the fast moving mobile station can be handled by the control base station having a larger capacity. Therefore, it becomes possible in this fourth embodiment to provide a method of handover in a mobile radio communication capable of securing the high quality of service regardless of the moving speed of the mobile station.

Referring now to FIG. 19, a fifth embodiment of a mobile radio communication system using a method of handover according to the present invention will be described in detail.

In this fifth embodiment, the system configuration is substantially the same as that of the first embodiment shown in FIG. 4. Also, each of the base stations has a configuration substantially the same as that of the first embodiment shown in FIG. 6.

This fifth embodiment concerns with a case of utilizing a 3-channel TDMA (time division multiple access) method, in which a decentralized autonomous control is realized in the cellular system by a mobile station monitoring the receiving levels of the base stations without any command from the central control station in order to carry out the handover operation.

Here, each of the base stations has a predetermined number of traffic channels assigned according to the traffic demand of each cell area, and a control channel which is either common to all the base stations or different for each base station. The co-channel reuse of these traffic channels and the control channel is possible in this system.

In the control channel, the set up of calls to and from the mobile station to assign the traffic channel to be used is controlled, and each base station notifies the control channel numbers of the neighboring base stations to the mobile station. The mobile station selectively monitors the control channel of the highest receiving level at any given moment.

In this system, the mobile station determines a cell in which it is located by monitoring the receiving levels of the base stations, and notifies the determined located cell information to the base stations in order to carry out the handover operation, by operating in a manner shown in FIG. 19.

Namely, in the traffic channel, the mobile station operates in a sequence of the mobile station transmission time slots 500, 502, and 504 in the traffic channel in which the mobile station transmits the radio waves to the currently used base station through which it is communicating, and the mobile station reception time slots 501, 503, and 505 in the traffic channel in which the mobile station receives the signals from that currently used base station.

In addition, the mobile station switches to the control channel at idle periods of the traffic channel such as a period between the mobile station reception time slot 501 and the mobile station transmission time slot 502, and operates in the neighboring base station receiving level monitoring time slots 506 and 507 in the control channel in which the receiving levels of the control channels of the neighboring base stations are monitored. In a case the control channel of each base station is different from that of the other base stations, the control channels of the neighboring base stations specified in the control channel of the currently used base station are sequentially monitored in each neighboring base station receiving level monitoring time slot. On the other hand, in a case the common control channel is used for the time division multiple access by all the base stations, the time slot is sequentially switched after the mobile station switches to the control channel.

Then, the mobile station selects the neighboring base station for which the monitored receiving level is the highest among all the neighboring base stations, and compares the receiving level of the currently used base station with the receiving level of the selected neighboring base station. When the receiving level of the neighboring base station is higher than that of the currently used base station, the mobile station judges that it has moved to a cell of that selected neighboring base station. When this moving into a cell of the neighboring base station is detected, the mobile station switches to the control channel of that selected neighboring base station and transmits the destination base station notification signal at the located cell information notification time slot 508.

In this system, the central control station outputs the control station signal in a format shown in FIG. 20 to the loop transmission line, where the control station signal includes an addressed base station number 509 indicating a base station from which this control station signal is to be transmitted to the mobile station, a control signal 510, and a transmission signal 511 to be transmitted to the mobile station in the traffic channel. This control station signal is sequentially relayed through the loop transmission line by the base stations to the addressed base station indicated by the addressed base station number 509 from which this control station signal is transmitted to the mobile station.

On the other hand, when the base station receives the signal from the mobile station, the base station outputs a mobile station signal in a format shown in FIG. 21, where the mobile station signal includes a relay base station number 512 indicating a base station at which this mobile station signal is received from the mobile station, a control signal 513, and a transmission signal 514 to be transmitted to the central control station. This mobile station signal is sequentially relayed through the loop transmission line by the base stations to the central control station.

Also, the control channel signal in a format shown in FIG. 22 is transmitted through the loop transmission line, where the control channel signal includes a generating station number 515 indicating a station from which this control channel signal is generated, an addressed station number 516 indicating a station to which this control channel signal is to be transmitted, and a control signal 517. Here, the generating station and the addressed station can includes any of the base stations as well as the central control station and the mobile station.

In this fifth embodiment, the handover operation can be carried out by any one of the following five procedures according to the need.

Figure 23:
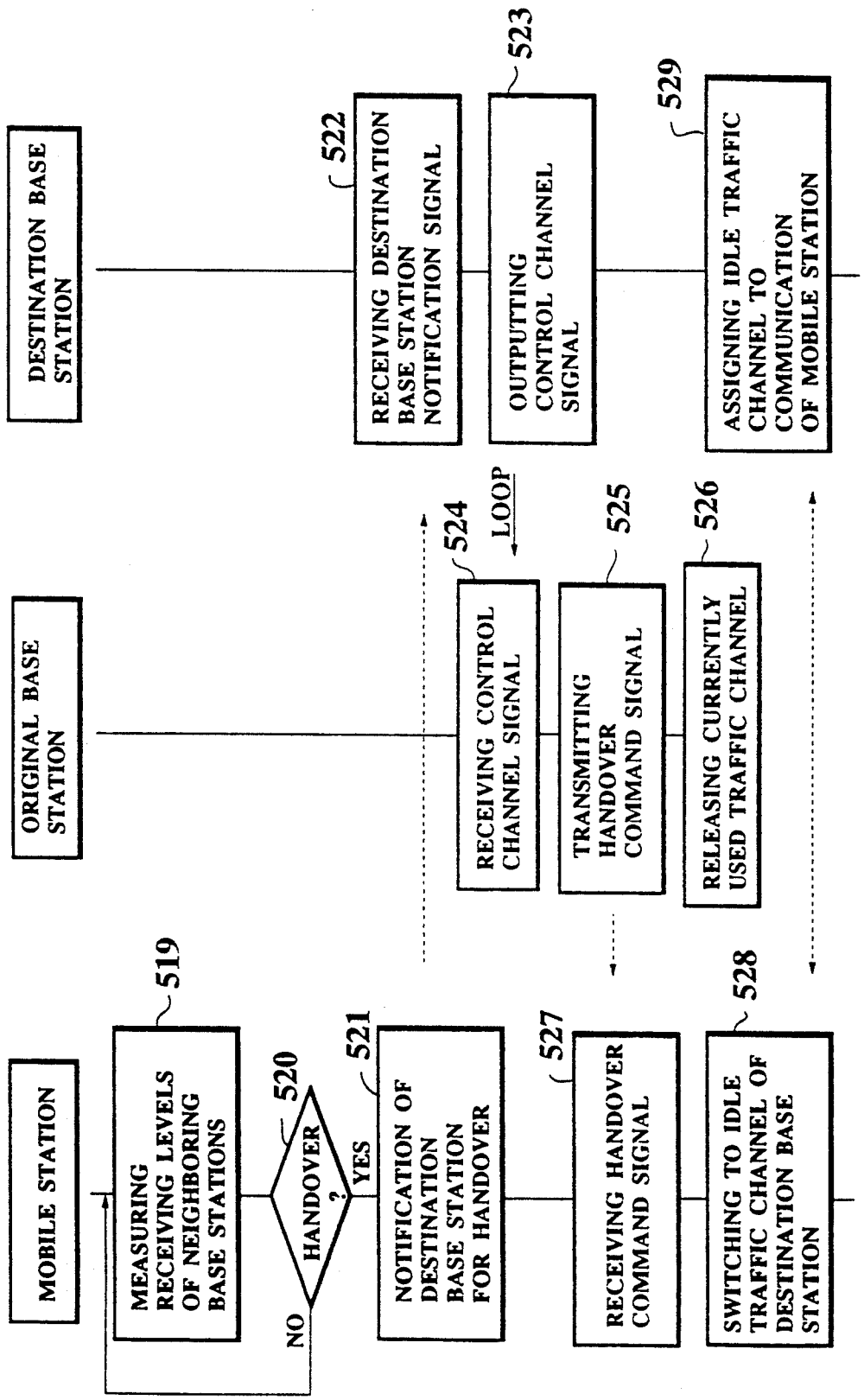
FIG. 23 is a flow chart for a first procedure of the handover operation in the system of the fifth embodiment.

The first procedure shown in FIG. 23 is for a case in which the control channels of the base stations are different each other.

In this first procedure, first at the step 519, the mobile station measures the current receiving level of the currently used base station through which it is communicating at the mobile station reception time slot, while measuring the receiving levels of the control channels of the neighboring base stations by switching to the control channel during the idle periods in the traffic channel and determining the selected neighboring base station which has the highest neighboring base station receiving level.

Then, at the step 520, the mobile station judges whether it has moves into a cell of the neighboring base station or not by comparing the highest neighboring base station receiving level and the current receiving level. When the highest neighboring base station receiving level is higher than the current receiving level, it is judged that the mobile station has moved to a cell of the selected neighboring base station at the step 520, and next at the step 521 the mobile station switches to the control channel of the selected neighboring base station during the idle period in the traffic channel and transmits the destination base station notification signal at the located cell information notification time slot, whereas otherwise the step 519 is repeated.

When the destination base station receives this destination base station notification signal in the control channel at the step 522, next at the step 523, the destination base station selects an idle traffic channel available, and outputs the control channel signal of FIG. 22 to the loop transmission line, with itself as the generating station, the original base station as the addressed base station, and the control signal indicating the handover to the selected idle traffic channel.

When the original base station receives this control channel signal through the loop transmission line at the step 524, the original base station transmits the handover command signal indicating the idle traffic channel of the destination base station specified in the control channel signal to the mobile station in the currently used traffic channel at the step 525, and then releases the currently used traffic channel at the step 526 so as to stop relaying the communication of the mobile station.

When the mobile station receives this handover command signal from the original base station at the step 527, the mobile station switches its traffic channel to the idle traffic channel of the destination station at the step 528, while the destination base station starts relaying the communication of the mobile station by assigning the idle traffic channel at the step 529.

Figure 24:
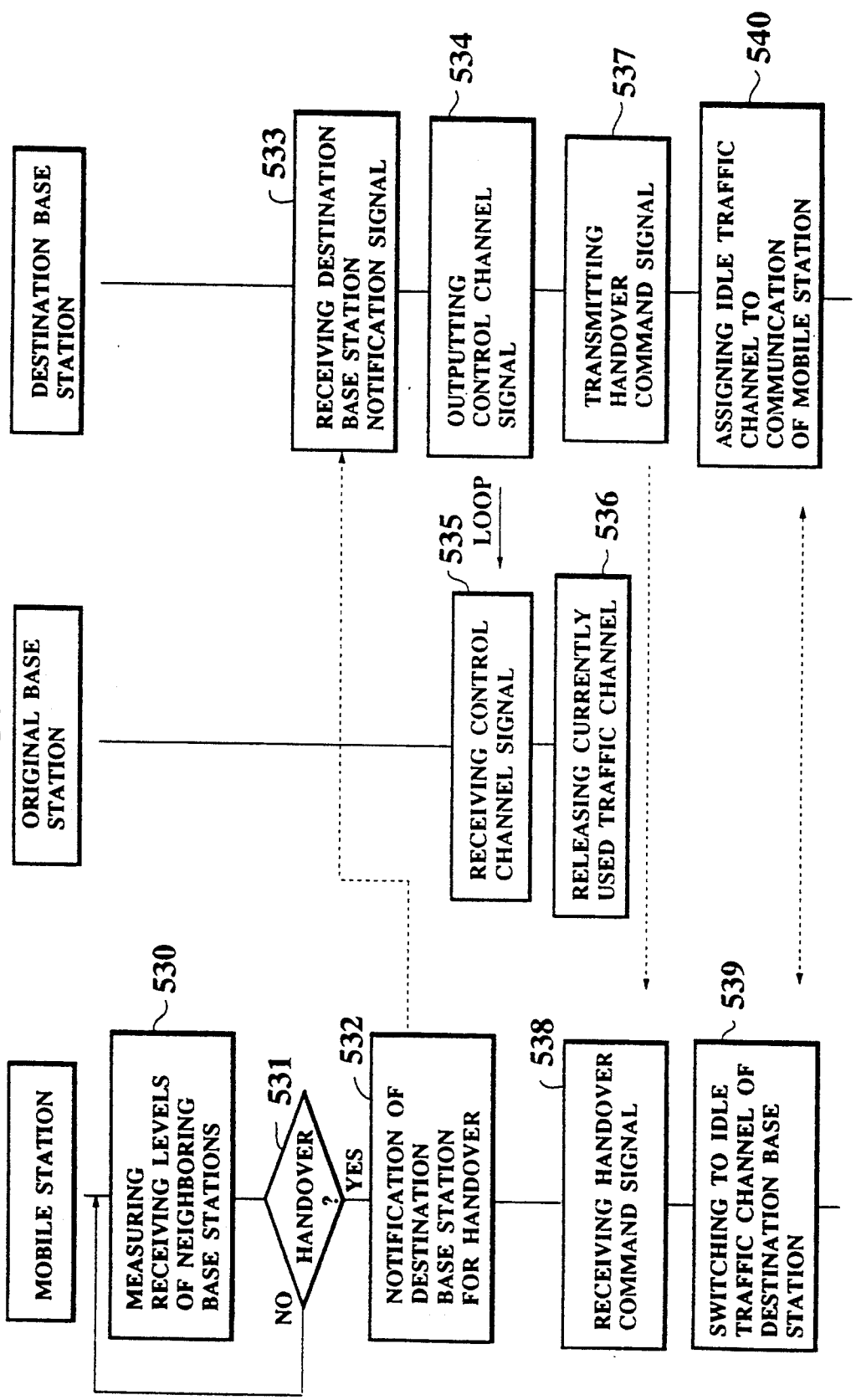
FIG. 24 is a flow chart for a second procedure of the handover operation In the system of the fifth embodiment.

The second procedure shown in FIG. 24 is also for a case in which the control channels of the base stations are different each other.

In this second procedure, first at the step 530, the mobile station measures the current receiving level of the currently used base station through which it is communicating at the mobile station reception time slot, while measuring the receiving levels of the control channels of the neighboring base stations by switching to the control channel during the idle periods in the traffic channel and determining the selected neighboring base station which has the highest neighboring base station receiving level.

Then, at the step 531, the mobile station judges whether it has moves into a cell of the neighboring base station or not by comparing the highest neighboring base station receiving level and the current receiving level. When the highest neighboring base station receiving level is higher than the current receiving level, it is judged that the mobile station has moved to a cell of the selected neighboring base station at the step 531, and next at the step 532 the mobile station switches to the control channel of the selected neighboring base station during the idle period in the traffic channel and transmits the destination base station notification signal at the located cell information notification time slot, whereas otherwise the step 530 is repeated.

When the destination base station receives this destination base station notification signal in the control channel at the step 533, next at the step 534, the destination base station outputs the control channel signal of FIG. 22 to the loop transmission line, with itself as the generating station, the original base station as the addressed base station, and the control signal indicating the occurrence of the handover and commanding the release of the currently used traffic channel.

When the original base station receives this control channel signal through the loop transmission line at the step 535, the original base station releases the currently used traffic channel at the step 536 so as to stop relaying the communication of the mobile station.

Then, at the step 537, the destination base station selects an idle traffic channel available, and transmits the handover command signal indicating the idle traffic channel for the handover to the mobile station by using the currently used traffic channel.

When the mobile station receives this handover command signal from the destination base station at the step 538, the mobile station switches its traffic channel to the idle traffic channel of the destination station at the step 539, while the destination base station starts relaying the communication of the mobile station by assigning the idle traffic channel at the step 540.

Figure 25:
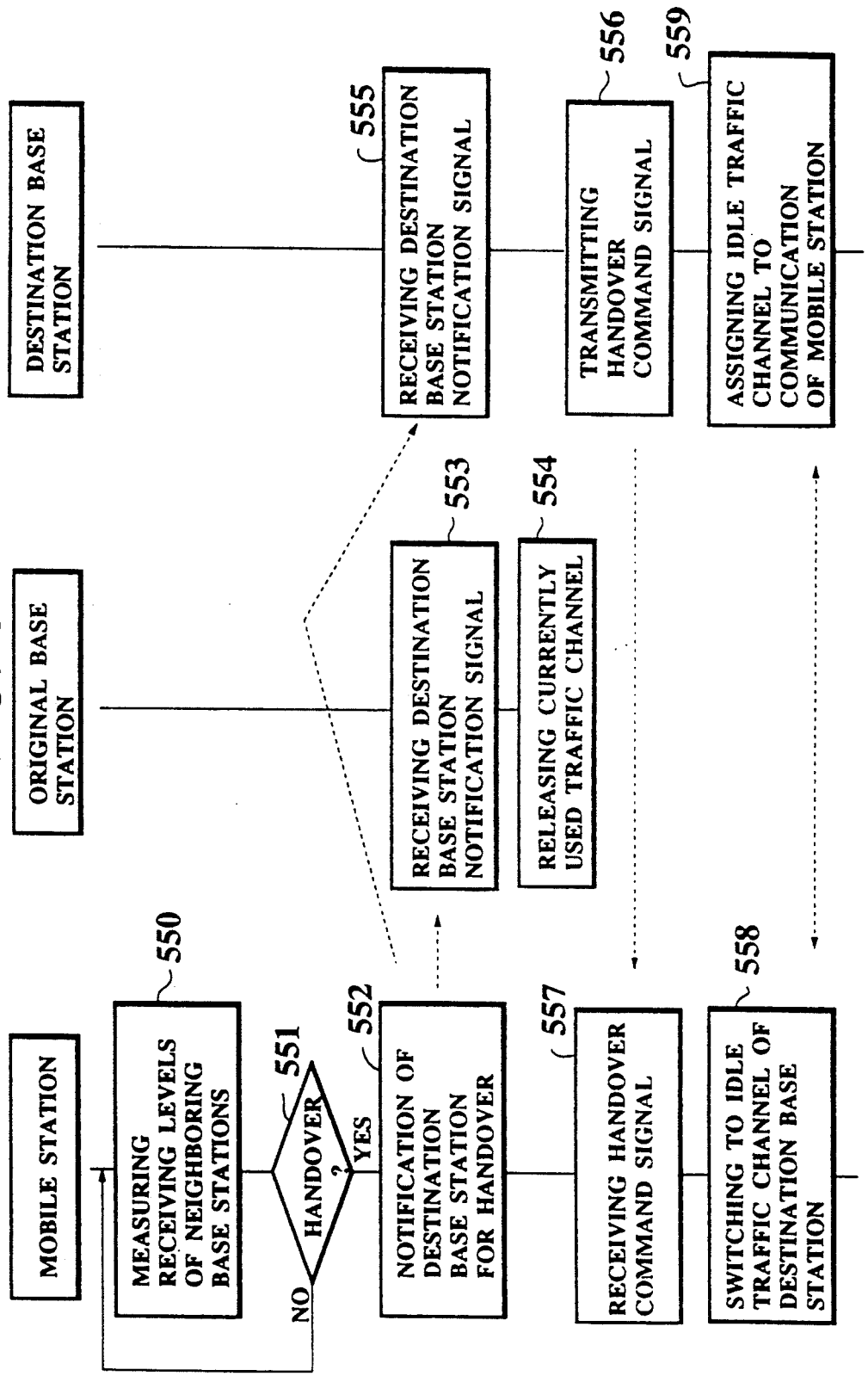
FIG. 25 is a flow chart for a third procedure of the handover operation in the system of the fifth embodiment.

The third procedure shown in FIG. 25 is for a case in which a common control channel is shared by all the base stations.

In this third procedure, first at the step 550, the mobile station measures the current receiving level of the currently used base station through which it is communicating at the mobile station reception time slot, while measuring the receiving levels of the control channels of the neighboring base stations by switching to the control channel during the idle periods in the traffic channel and determining the selected neighboring base station which has the highest neighboring base station receiving level.

Then, at the step 551, the mobile station judges whether it has moves into a cell of the neighboring base station or not by comparing the highest neighboring base station receiving level and the current receiving level. When the highest neighboring base station receiving level is higher than the current receiving level, it is judged that the mobile station has moved to a cell of the selected neighboring base station at the step 551, and next at the step 552 the mobile station switches to the common control channel of the base stations during the idle period in the traffic channel and transmits the destination base station notification signal at the located cell information notification time slot, whereas otherwise the step 550 is repeated.

When the original base station receives this destination base station notification signal in the control channel at the step 553, the original base station releases the currently used traffic channel at the step 554 so as to stop relaying the communication of the mobile station.

Meanwhile, when the destination base station receives this destination base station notification signal in the control channel at the step 555, next at the step 556, the destination base station selects an idle traffic channel available, and transmits the handover command signal indicating the idle traffic channel for the handover to the mobile station by using the currently used traffic channel.

When the mobile station receives this handover command signal from the destination base station at the step 557, the mobile station switches its traffic channel to the idle traffic channel of the destination station at the step 558, while the destination base station starts relaying the communication of the mobile station by assigning the idle traffic channel at the step 559.

Figure 26:
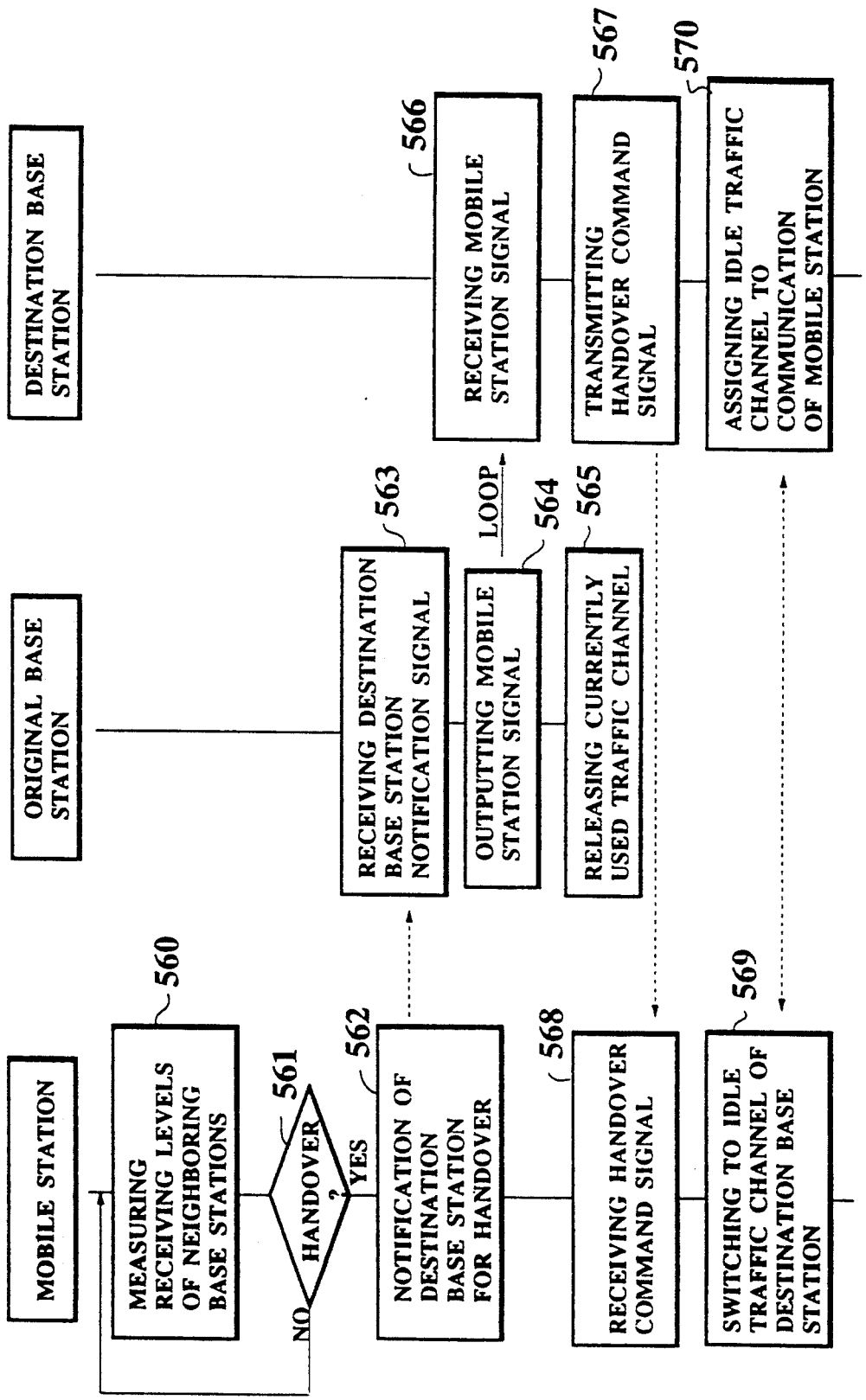
FIG. 26 is a flow chart for a fourth procedure of the handover operation in the system of the fifth embodiment.

The fourth procedure shown in FIG. 26 is carried out as follows.

First at the step 560, the mobile station measures the current receiving level of the currently used base station through which it is communicating at the mobile station reception time slot, while measuring the receiving levels of the control channels of the neighboring base stations by switching to the control channel during the idle periods in the traffic channel and determining the selected neighboring base station which has the highest neighboring base station receiving level.

Then, at the step 561, the mobile station judges whether it has moves into a cell of the neighboring base station or not by comparing the highest neighboring base station receiving level and the current receiving level. When the highest neighboring base station receiving level is higher than the current receiving level, it is judged that the mobile station has moved to a cell of the selected neighboring base station at the step 561, and next at the step 562 the mobile station transmits the destination base station notification signal by using either the control channel or the currently used traffic channel of the original base station, whereas otherwise the step 560 is repeated.

When the original base station receives this destination base station notification signal in the control channel or the currently used traffic channel at the step 563, the original base station outputs the mobile station signal of FIG. 21 to the loop transmission line, with itself as the relay base station, and the control signal indicating the handover command at the step 564, and then releases the currently used traffic channel at the step 565 so as to stop relaying the communication of the mobile station.

When the destination base station receives this mobile station signal through the loop transmission line at the step 566, next at the step 567, the destination base station selects an idle traffic channel available, and transmits the handover command signal indicating the idle traffic channel for the handover to the mobile station by using the currently used traffic channel.

When the mobile station receives this handover command signal from the destination base station at the step 568, the mobile station switches its traffic channel to the idle traffic channel of the destination station at the step 569, while the destination base station starts relaying the communication of the mobile station by assigning the idle traffic channel at the step 570.

Figure 27:
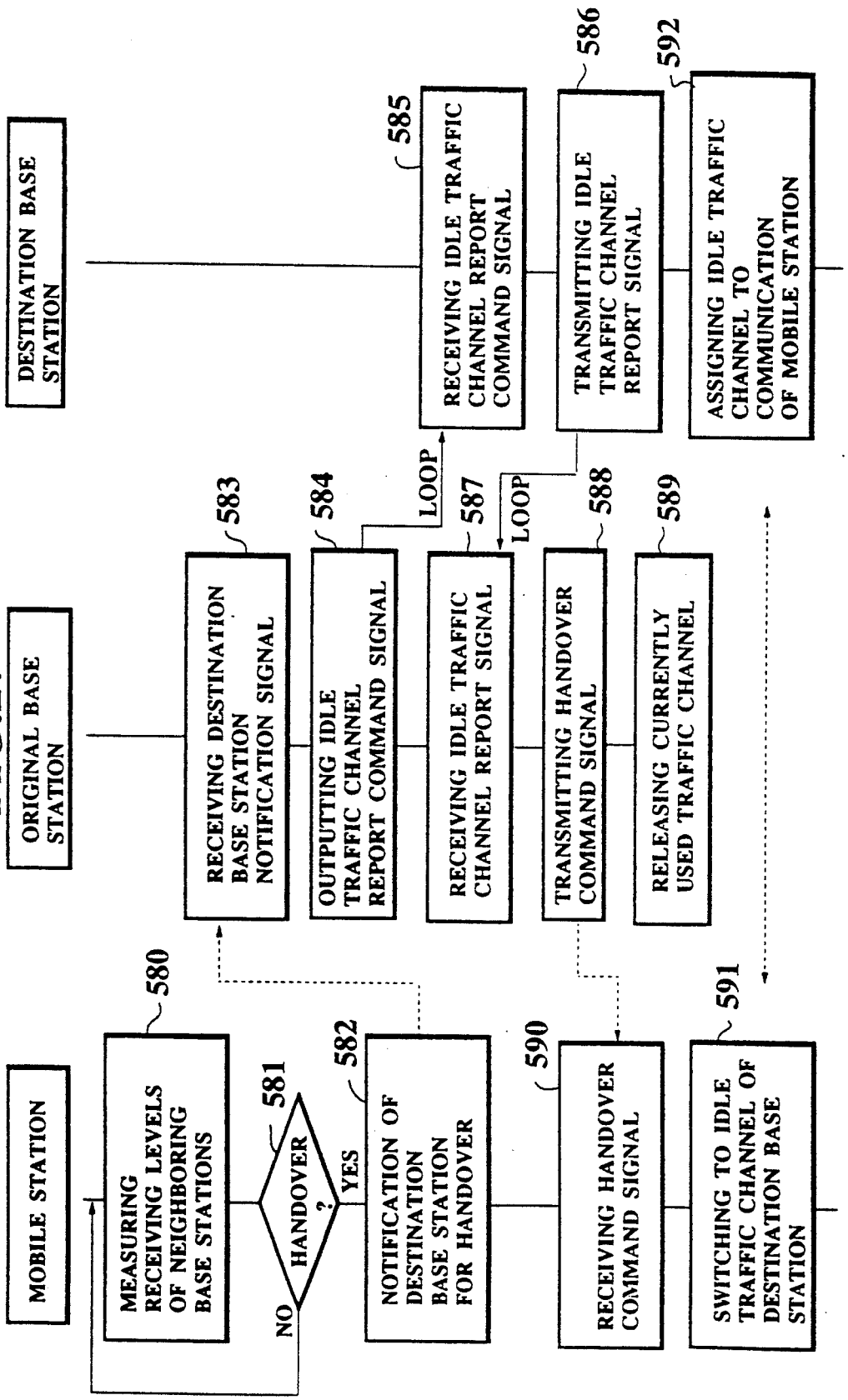
FIG. 27 is a flow chart for a fifth procedure of the handover operation in the system of the fifth embodiment.

The fifth procedure shown in FIG. 27 is carried out as follows.

First at the step 580, the mobile station measures the current receiving level of the currently used base station through which it is communicating at the mobile station reception time slot, while measuring the receiving levels of the control channels of the neighboring base stations by switching to the control channel during the idle periods in the traffic channel and determining the selected neighboring base station which has the highest neighboring base station receiving level.

Then, at the step 581, the mobile station judges whether it has moves into a cell of the neighboring base station or not by comparing the highest neighboring base station receiving level and the current receiving level. When the highest neighboring base station receiving level is higher than the current receiving level, it is judged that the mobile station has moved to a cell of the selected neighboring base station at the step 581, and next at the step 582 the mobile station transmits the destination base station notification signal by using either the control channel or the currently used traffic channel of the original base station, whereas otherwise the step 580 is repeated.

When the original base station receives this destination base station notification signal in the control channel or the currently used traffic channel at the step 583, the original base station outputs the idle traffic channel report command signal to the loop transmission line at the step 584.

When the destination base station receives this idle traffic channel report command signal through the loop transmission line at the step 585, next at the step 586, the destination base station selects an idle traffic channel available, and transmits the idle traffic channel report signal indicating the idle traffic channel for the handover to the loop transmission line.

When the original base station receives this idle traffic channel report signal through the loop transmission line at the step 587, the original base station transmits the handover command signal indicating the reported idle traffic channel of the destination base station to the mobile station at the step 588 by using the currently used traffic channel at the step 588, and then releases the currently used traffic channel at the step 589 so as to stop relaying the communication of the mobile station.

When the mobile station receives this handover command signal from the original base station at the step 590, the mobile station switches its traffic channel to the idle traffic channel of the destination station at the step 591, while the destination base station starts relaying the communication of the mobile station by assigning the idle traffic channel at the step 592.

It is to be noted that this fifth embodiment is equally applicable to a case using a method other than TDMA, such as FDMA (frequency division multiple access) and CDMA (code division multiple access). In using FDMA, the monitoring of the receiving levels of the neighboring base stations can be achieved by using the method disclosed in Japanese Patent Application No. 61-192284. In using CDMA, the channels in the above description for the case of using TDMA should be replaced by codes.

Thus, according to the fifth embodiment, it becomes possible to establish a so called decentralized autonomous control in the cellular system in which a mobile station monitors the receiving levels of the base stations, judges whether it is moving into a cell of the neighboring base station, and transmits the located cell information to the base stations In order to initiate the handover operation, without any command from the central control station, such that the handover operation can be carried out less time consumingly compared with a conventional cellular system without increasing the capacities and sizes of each base station and the central control station and complicating the configurations of the base stations and the central control station. As a consequence, it becomes possible to use the smaller cell radius so as to improve the frequency spectrum utilization efficiency, and to secure the high quality of service regardless of the moving speed of the mobile station.

Figure 28:
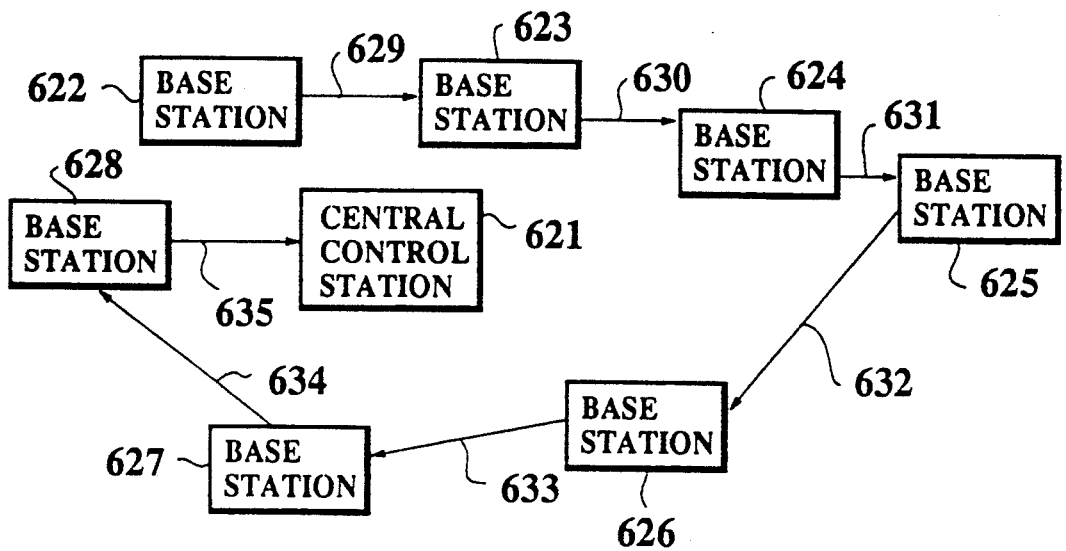
FIG. 28 is a schematic diagram of a sixth embodiment of a mobile radio communication system in a form of a cellular system using a method of route diversity according to the present invention.

Referring now to FIG. 28, a sixth embodiment of a mobile radio communication system using a method of route diversity according to the present invention will be described in detail.

In this sixth embodiment, the system comprises a central control station 621 and a plurality (seven in FIG. 28) of base stations 622 to 628, which are connected through a inter-station transmission line formed by a transmission line element 629 connecting between the base stations 622 and 623, a transmission line element 630 connecting between the base stations 623 and 624, a transmission line element 631 connecting between the base stations 624 and 625, a transmission line element 632 connecting between the base stations 625 and 626, a transmission line element 633 connecting between the base stations 626 and 627, a transmission line element 634 connecting between the base stations 627 and 628, and a transmission line element 635 connecting between the base station 628 and the central control station 621.

Figure 29:
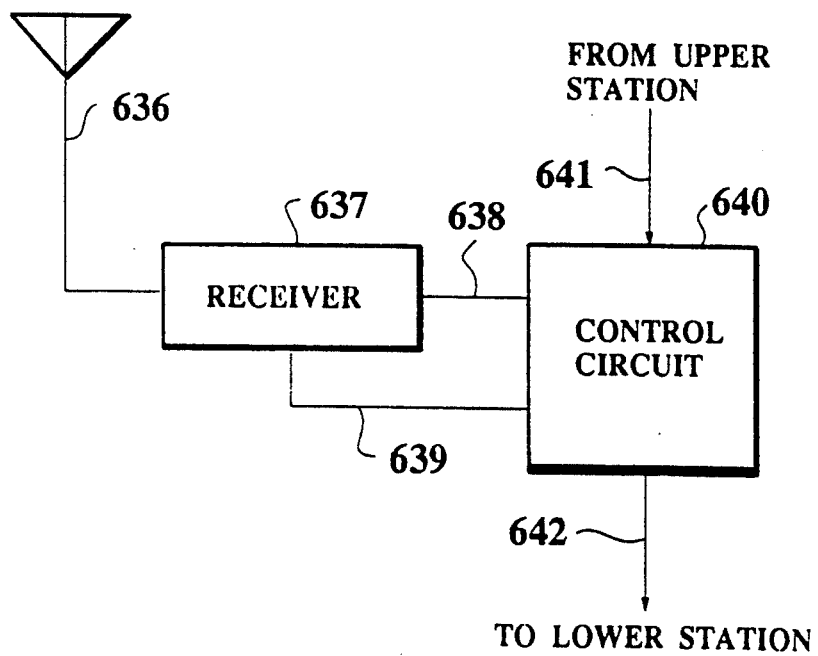
FIG. 29 is a schematic diagram of a configuration of each base station in the system of FIG. 28.

Each of the base stations 622 to 628 has a schematic configuration shown in FIG. 29, where the base station comprises an antenna 636 for receiving the radio waves from a mobile station, a receiver 637 for receiving the transmitted signal from the antenna 626, a control circuit 640 connected with the receiver 637 through a received signal line 638 and a receiving level information line 639, a transmission line element 641 for receiving signals from an upper station through the inter-station transmission line, and a transmission line element 642 for transmitting signals to a lower station through the inter-station transmission line.

Figure 30:
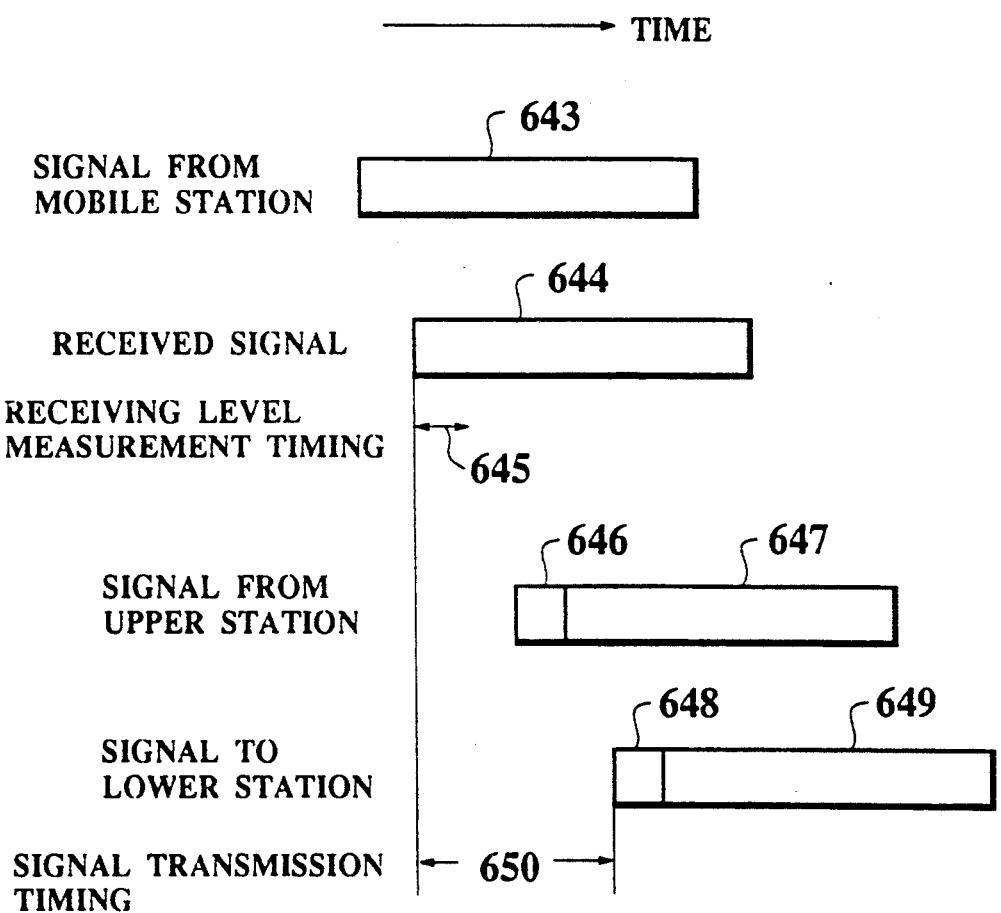
FIG. 30 is a timing diagram for an operation of a base station to achieve the route diversity reception in the system of FIG. 28.

This system of the sixth embodiment operates according to a diagram shown in FIG. 30 as follows.

The base station 622 is located at a top position of the inter-station transmission line, so that there is no signals from the upper station for this base station 622. Therefore, when this base station 622 receives a signal 643 from a mobile station as a received signal 644, the receiver 637 of the base station 622 measures the receiving level of this received signal 644 at a measurement timing 645, and the measured receiving level is transmitted to the control circuit 640 through the receiving level information line 639 while the received signal 644 is transmitted to the control circuit 640 through the received signal line 638. At the control circuit 640, a signal transmission timing 650 for transmitting the signal to the lower station is set to be equal to or somewhat longer than the measurement timing 645, and the control circuit 640 outputs an encoded receiving level information 648 indicating the receiving level measured by the receiver 637 and a transmission signal 649 identical to the received signal 644 together to the inter-station transmission line through the transmission line element 642.

At each of the remaining base stations 623 to 628, when the signal 643 from a mobile station is received as the received signal 644, the receiver 637 of the base station measures the receiving level of the received signal 644 at the measurement timing 645, and the measured receiving level is transmitted to the control circuit 640 through the receiving level information line 639 while the received signal 644 is transmitted to the control circuit 640 through the received signal line 638. Meanwhile, at the control circuit 640, the signal including the receiving level information 646 and the transmission signal 647 is received from the upper station through the inter-station transmission line and the transmission line element 641. The control circuit 640 then compares the receiving level measured by the receiver 637 and the receiving level indicated by the receiving level information 646.

When the receiving level measured by the receiver 637 is higher than the receiving level indicated by the receiving level information 646, the control circuit 640 outputs the encoded receiving level information 648 indicating the receiving level measured by the receiver 637 and the transmission signal 649 identical to the received signal 644 received by the receiver 637 together to the inter-station transmission line through the transmission line element 642 at the signal transmission timing 650.

On the other hand, when the receiving level indicated by the receiving level information 646 is higher than the receiving level measured by the receiver 637, the control circuit 640 outputs the encoded receiving level information 648 identical to the receiving level information 646 and the transmission signal 649 identical to the transmission signal 647 together to the inter-station transmission line through the transmission line element 642 at the signal transmission timing 650.

Thus, the receiving level information 648 and the transmission signal 649 to be transmitted to the lower station are sequentially updated at the base stations 623 to 628, such that when the central control station 621 receives the receiving level information 646 and the transmission signal 647 from the last base station 628 through the inter-station transmission line, the receiving level indicated by the receiving level information 646 is the highest receiving level obtained among the base stations 622 to 628, and the transmission signal 647 represents the signal received from the mobile station by one of the base stations 622 to 628 at this highest receiving level, so that the route diversity reception is achieved by using the transmission signal 647 received by the central control station 621 as the signal received from the mobile station in the system.

Now, the signal transmission timing 650 will be described in further detail.

Namely, when the base stations 622 to 628 are sequentially numbered by orders of positions on the interstation transmission line in a direction of the signal transmission, the signal transmission timing $T_{5,i}$ for the i-th base station is given by:

$$T_{5,i} \geq T_{5,i-1} + T_m + \Delta T_r$$

where $T_m$ is a time required for receiving the receiving level information 646 transmitted from the upper station, and $\Delta T_r$ is a sum of a radio propagation delay difference due to the difference of the distances between the mobile station and the base stations 622 to 628 and a signal transmission delay between the neighboring base stations on the inter-station transmission line.

The radio propagation delay difference compensates the variation of the receiving time of the radio waves from the mobile station at the base stations due to the difference of the distances between the mobile station and the base stations 622 to 628, and can be considered as a propagation time for a distance between the neighboring base stations on the inter-station transmission line, so that when the distance between the neighboring base stations is 10 km for example, the radio propagation delay difference is equal to $10 \times 10^3/(3 \times 10^8) = 3 \times 10^{-5}$ sec = 0.03 ms.

As for the signal transmission delay between the neighboring base stations on the Inter-station transmission line, considering the fact that the transmission line is not straight, it is sufficient for this signal transmission delay to take a value equal to several times the radio propagation delay difference, so that $\Delta T_r = 0.2$ ms to 0.3 ms is sufficient for the above described exemplary case.

Now, the operation of the system of the sixth embodiment described so far assumes that all the base stations 622 to 628 can receive the signal from the mobile station. However, in reality, only a part of the base stations 622 to 628 will be able to receive the signal from the mobile station in general.

In a case only a part of the base stations 622 to 628 can receive the signal from the mobile station, the system of the sixth embodiment operates as follows.

Let the J-th base station be the earliest base station in the order of positions along the inter-station transmission line which can receive the signal from the mobile station. When the signal from the mobile station is received at this J-th base station, the control circuit 640 of this J-th base station will wait for the receiving level information 646 and the transmission signal 647 from the upper station. However, in this case, no upper station can transmit the receiving level information 646 and the transmission signal 647 to the inter-station transmission line because no upper station is capable of receiving the signal from the mobile station. Thus, after waiting for the signal transmission timing 650, the control circuit 640 of the J-th base station outputs the receiving level information 648 indicating the receiving level measured by the receiver 637 and the transmission signal 649 identical to the received signal 644 received by the receiver 637 to the inter-station transmission line through the transmission line element 642.

On the other hand, let the k-th base station be the base station whose upper station is capable of receiving the signal from the mobile station but which itself is not capable of receiving the signal from the mobile station. At this k-th base station, the receiving level information 646 and the transmission signal 647 are received from the upper station through the inter-station transmission line and the transmission line element 641 while not receiving the signal from the mobile station at the receiver 637. Thus, after waiting for Tm+ΔTr since the reception of the receiving level information 646 and the transmission signal 647 from the upper station, the control circuit 640 of this k-th base station outputs the receiving level information 648 identical to the receiving level information 646 and transmission signal 649 identical to the transmission signal 647 to the inter-station transmission line and the transmission line element 642.

In this sixth embodiment, the level fluctuation can be averaged out by using the longer receiving level measurement timing 645 such that the accuracy of the receiving level measurement can be improved. However, the use of the longer receiving level measurement timing also makes the transmission time on the transmission line longer so that the transmission delay may present some problem in such a case.

Thus, the receiving level measurement timing 645 should be determined by taking the maximum allowable transmission delay of the system into account. In a case the maximum allowable transmission delay is sufficiently large, the receiving level measurement timing 645 can be set equal to the entire signal duration, whereas in a case the maximum allowable transmission delay is not so large, the receiving level measurement timing 645 should be set equal to only a part of a top portion of the entire signal duration.

Also, in this sixth embodiment, the receiving level information 648 and the transmission signal 649 may be transmitted through the inter-station transmission line separately. In such a case, the receiving level informations from a plurality of the base stations may be multiplexed and transmitted by using a channel different from a channel used for transmitting the transmission signals.

Thus, according to the sixth embodiment, it is possible to provide a method of route diversity in a mobile radio communication which can be realized less expensively, without requiring additional control function which complicates the central control station.

It is to be noted that in the above embodiments, the central control station and the base stations are provided separately, but the present invention is equally applicable to a system in which one of the base stations plays the role of the central control station as well.

Moreover, in the above embodiments, the receiving level is utilized as the key for determining the destination base station, but the other signal reception characteristics such as a number of detected errors or an eye opening in a case of digital signal with error correction encoding, an S/N ratio in a case of analog signal, and their combinations may also be utilized as the key for determining the destination base station.

Besides these, many modifications and variations of the above embodiments may be made without departing from the novel and advantageous features of the present invention. Accordingly, all such modifications and variations are intended to be included within the scope of the appended claims.

What is claimed is:

1. A method of handover in a mobile radio communication using a cellular system formed by a plurality of base stations, in ring topology the method comprising the steps of:

providing a single directional loop transmission line by which each base station is connected with neighboring base stations;

transmitting a handover information through the loop transmission line, where the handover information is relayed by each base station from one of the neighboring base stations to another one of the neighboring base station such that the handover information is circulated through the loop transmission line in a predetermined direction; and carrying out the handover of a communication of a mobile station from one traffic channel of one base station to an idle traffic channel of another base station by using the handover information circulated through the loop transmission line.

2. The method of claim 1, wherein the handover information includes a base station identification of a currently used base station, a currently used traffic channel at the currently used base station, and a receiving quality for radio waves from the mobile station at the currently used base station.

3. The method of claim 2, wherein the receiving quality includes at least one of a receiving level, a number of detected errors, an eye pattern opening, and an S/N ratio.

4. The method of claim 2, wherein each of the neighboring base stations of the currently used base station recognizes the currently used base station according to the base station identification of the currently used base station specified in the handover information, and measures a receiving quality for the radio waves from the mobile station in the currently used traffic channel at said each of the neighboring base stations according to the currently used traffic channel specified in the handover information.

5. The method of claim 4, wherein each of the neighboring base stations of the currently used base station detects a motion of the mobile station from a cell of the currently used base station to a cell of said each of the neighboring base stations when the receiving quality measured by said each of the neighboring base stations is greater than the receiving quality at the currently used base station specified in the handover information.

6. The method of claim 5, wherein the handover information further includes a base station identification of one of the neighboring base stations of the currently used base station which detected the motion of the mobile station from the cell of the currently used base station to the cell of said one of the neighboring base station, and an idle traffic channel available for the handover at said one of the neighboring base stations.

7. The method of claim 6, wherein the currently used base station commands the mobile station to carry out the handover from the currently used traffic channel to the idle traffic channel of said one of the neighboring base station of the currently used base station which detected the motion of the mobile station to the cell of the currently used base station to the cell of said one of the neighboring base station, according to the idle traffic channel specified in the handover information.

8. The method of claim 2, wherein each base station measures a receiving quality for the radio waves from the mobile station in the currently used traffic channel at said each base station according to the current used traffic channel specified n the handover information.

9. The method of claim 8, wherein the handover information further includes a measuring base station identification of a base station which measured the receiving quality specified in the handover information, and when the receiving quality measured by each base station is greater than the receiving quality specified in the handover information, said each base station replaces the measuring base station identification in the handover information by a base station identification of said each base station and replaces the receiving quality in the handover information by the receiving quality measured by said each base station while relaying the handover information to said another one of the neighboring base stations through the loop transmission line, whereas otherwise said each base station relays the handover information to said another one of the neighboring base stations through the loop transmission line without changing the handover information transmitted to said each base station from said one of the neighboring base stations.

10. The method of claim 9, wherein the handover information further includes an idle traffic channel available for the handover at a base station specified by the measuring base station identification in the handover information.

11. The method of claim 10, wherein the currently used base station commands the mobile station to carry out the handover from the currently used traffic channel to the idle traffic channel of the base station specified by the measuring base station identification in the handover information, according to the idle traffic channel specified in the handover information.

12. The method of claim 1, wherein the cellular system includes a central control station for controlling the base stations which is connected to the loop transmission line, and a plurality of land transmission lines connecting the central control station with each of the base stations.

13. The method of claim 12, wherein the handover information includes a base station identification of a currently used base station, a currently used traffic channel at the currently used base station, base station identifications of the neighboring base stations of the currently used base station, and receiving qualities for radio waves from the mobile station measured at the neighboring base stations.

14. The method of claim 13, wherein each of the neighboring base stations of the currently used base station recognizes the currently used base station according to the base station identification of the currently used base station specified in the handover information, measures a receiving quality for the radio waves from the mobile station in the currently used traffic channel according to the currently used traffic channel specified in the handover information, and outputs the base station identification of said each of the neighboring base stations and the receiving quality measured at said each of the neighboring base stations as a part of the handover information to the loop transmission line.

15. The method of claim 14, wherein the central control station selects one of the neighboring base stations for which the measured receiving quality is the highest as a destination base station for the handover, and controls the base stations to carry out the handover through the land transmission lines.

16. The method of claim 12, the handover information includes a base station identification of each base station and an idle traffic channel available for the handover at said each base station.

17. The method of claim 16, wherein the central control station selects one of the base stations as a destination base station for the handover by using the land transmission lines, and a currently used base station commands the mobile station to carry out the handover from a currently used traffic channel tot he idle traffic channel of the base station selected by the central control station as the destination base station according to the idle traffic channel of said destination base station specified in the handover information.

18. A method of handover in a mobile radio communication using a cellular system formed by a plurality of control base stations each of which is covering a cell within a service area of the system, a plurality of base stations each of which is covering a mini-cell within a cell area of the cell covered by each of the control base stations, wherein the plurality of base stations within a cell area of a control base station and the control base station form a ring topology, method comprising the steps of:

provviding a single directional loop transmission line by which a control base station and each base station are connected with neighboring base stations;

transmitting a handover information through the loop transmission line, where the handover information is relayed by each base station from one of the neighboring base stations to another one of the neighboring base station such that the handover information is circulated through the loop transmission line in a predetermined direction; and carrying out the handover of a communication of a mobile station from one traffic channel of one base station to an idle traffic channel of another base station by using the handover information circulated through the loop transmission line when a mobile station moves from one mini-cell to another mini-cell.

19. The method of claim 18, wherein the handover from one traffic channel of one of the base stations to an idle traffic channel of the control base station is carried out when the mobile station moves out of cell areas of the mini-cells within the cell covered by the control base station, and when a receiving quality for radio waves from the mobile station at said one of the base stations is lower than a functional capacity of said one of the base stations.

20. The method of claim 18, wherein the handover from one traffic channel of one control base station to an idle traffic channel of another control base station is carried out when the mobile station moves out of the cell covered by said one control base station, under a control by a system control station connected with each of the control base stations through a land transmission line.

21. A method of handover in a mobile radio communication using a cellular system formed by a plurality of base stations, in ring topology the method comprising the steps of:

providing a loop transmission line by which each base station is connected with neighboring base stations;

monitoring at a mobile station a receiving quality of each of the base stations via a control channel during idle periods of a currently used traffic channel and determining a destination base station for the handover;

transmitting a handover information through the loop transmission line, where the handover information is relayed by each base station from one of the neighboring base stations to another one of the neighboring base station such that the handover information is circulated through the loop transmission line in a predetermined direction; and carrying out the handover of a communication of the mobile station from the currently used traffic channel of a currently used base station to an idle traffic channel of the destination base station determined by the mobile station by using the handover information circulated through the loop transmission line.

22. The method of claim 21, wherein the handover information includes the idle traffic channel available for the handover at the destination base station, and the currently used base station commands the mobile station to carry out the handover from the currently used traffic channel of the currently used base station to the idle traffic channel of the destination base station according to the idle traffic channel specified in the handover information, while releasing the currently used traffic channel.

23. The method of claim 21, wherein the handover information includes a command for releasing the currently used traffic channel such that the currently used base station releases the currently used traffic channel according to the command in the handover information, while the destination base station commands the mobile station to carry out the handover from the currently used traffic channel of the currently used base station to the idle traffic channel of the destination base station.

24. The method of claim 21, wherein the handover information includes a notification of the destination base station for the handover, and the destination base station commands the mobile station to carry out the handover from the currently used traffic channel of the currently used base station to the idle traffic channel of the destination base station in response to the notification in the handover information, while the currently used base station releases the currently used traffic channel.

25. The method of claim 21, wherein the handover information includes a notification of the destination base station for the handover and the idle traffic channel available for the handover at the destination base station, and the currently used base station commands the mobile station to carry out the handover from the currently used traffic channel of the currently used base station to the idle traffic channel of the destination base station according to the idle traffic channel specified in the handover information, while releasing the currently used traffic channel according to the notification in the handover information.

* * * * *

UNITED STATES PATENT AND TRADEMARK OFFICE
CERTIFICATE OF CORRECTION

PATENT NO.  : 5,317,623
DATED       : May 31, 1994
INVENTOR(S) : Masayuki SAKAMOTO, et al.

It is certified that error appears in the above-indentified patent and that said Letters Patent is hereby corrected as shown below:

On the title page, Item [73], the Assignee should read as follows:

--Nippon Telegraph and Telephone Corporation; NTT Mobile
  Communications Network Inc., both of Tokyo, Japan--

Signed and Sealed this

Thirteenth Day of September, 1994

Attest:

BRUCE LEHMAN

Attesting Officer

Commissioner of Patents and Trademarks